(12) United States Patent
Sun et al.

(10) Patent No.: US 11,550,421 B2
(45) Date of Patent: Jan. 10, 2023

(54) ELECTRONIC DEVICE CONTROL METHOD AND INPUT DEVICE

(71) Applicant: HUAWEI TECHNOLOGIES CO., LTD., Guangdong (CN)

(72) Inventors: Chi Wah Sun, Shenzhen (CN); Po Chin Yu, Shenzhen (CN); Wei Kuang Chu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 232 days.

(21) Appl. No.: 16/640,599

(22) PCT Filed: Aug. 21, 2017

(86) PCT No.: PCT/CN2017/098228
§ 371 (c)(1),
(2) Date: Feb. 20, 2020

(87) PCT Pub. No.: WO2019/036826
PCT Pub. Date: Feb. 28, 2019

(65) Prior Publication Data
US 2020/0174639 A1    Jun. 4, 2020

(51) Int. Cl.
*G06F 3/041*    (2006.01)

(52) U.S. Cl.
CPC .................. *G06F 3/04162* (2019.05); *G06F 2203/04106* (2013.01)

(58) Field of Classification Search
CPC ....... G06F 2203/04106; G06F 3/03545; G06F 3/0383; G06F 3/0393; G06F 3/041; G06F 3/04162
See application file for complete search history.

(56) References Cited

U.S. PATENT DOCUMENTS

| 6,330,976 | B1 | 12/2001 | Dymetman et al. |
| 2004/0150631 | A1* | 8/2004 | Fleck ...................... G06F 3/038 345/179 |
| 2006/0250380 | A1 | 11/2006 | Oliver |
| 2010/0001963 | A1 | 1/2010 | Doray et al. |
| 2010/0231558 | A1 | 9/2010 | Kwak |

(Continued)

FOREIGN PATENT DOCUMENTS

| CN | 101840303 A | 9/2010 |
| CN | 102135816 A | 7/2011 |

(Continued)

*Primary Examiner* — Temesghen Ghebretinsae
*Assistant Examiner* — Sosina Abebe
(74) *Attorney, Agent, or Firm* — Womble Bond Dickinson (US) LLP

(57) ABSTRACT

A method for controlling an electronic device by an input device, and an input device is disclosed. The method includes: controlling, by the input device, an electronic device by using a touch apparatus when the input device detects that the input device is in contact with the touch apparatus of the electronic device; and when the input device detects that the input device is in contact with an object surface beyond the touch apparatus of the electronic device, detecting, by the input device, a motion of the input device on the object surface, and sending information about the motion to the electronic device, to control the electronic device.

19 Claims, 21 Drawing Sheets

(56) References Cited

U.S. PATENT DOCUMENTS

| | | | |
|---|---|---|---|
| 2013/0107144 A1* | 5/2013 | Marhefka | G06F 1/3275 |
| | | | 349/12 |
| 2013/0147768 A1 | 6/2013 | Aroyan et al. | |
| 2014/0098072 A1 | 4/2014 | Singh et al. | |
| 2014/0347315 A1 | 11/2014 | Mo et al. | |
| 2016/0077784 A1 | 3/2016 | Yamada | |

FOREIGN PATENT DOCUMENTS

| | | |
|---|---|---|
| CN | 202110514 U | 1/2012 |
| CN | 103593100 A | 2/2014 |
| CN | 103838401 A | 6/2014 |
| CN | 104182089 A | 12/2014 |
| CN | 104932714 A | 9/2015 |
| CN | 106576123 A | 4/2017 |
| WO | 2016118173 A1 | 7/2016 |

\* cited by examiner

ELECTRONIC DEVICE CONTROL METHOD AND INPUT DEVICE

CROSS-REFERENCE TO RELATED APPLICATIONS

This application is a National Stage of International Application No. PCT/CN2017/098228, filed on Aug. 21, 2017, which is hereby incorporated by reference in its entirety.

TECHNICAL FIELD

The present disclosure relates to the terminal field, and in particular, to an electronic device control method and an input device.

BACKGROUND

An input device is one of main apparatuses for exchanging information between a user and a computer system, and is a bridge for communication between a computer and a user or another device. The input device includes a device such as a mouse or a digital pen. Due to good portability, the input device is widely applied to the field of microcomputers, for example, terminal products such as a notebook computer, a mobile phone, and a tablet computer.

However, an input device on a current market can be used only in a specific area or in a fixed mode. For example, a mouse can be used only on a desktop, and a capacitive digital pen can be used only on a touchscreen. The input device cannot provide a plurality of use modes for a user. A single function leads to poor user experience.

SUMMARY

Embodiments of the present disclosure provide an electronic device control method and an input device, to support to control an electronic device in a plurality of input modes.

A first aspect of an embodiment of the present disclosure provides an electronic device control method, including: detecting, by an input device, whether the input device is in contact with a touch apparatus of an electronic device; and controlling, by the input device, the electronic device by using the touch apparatus when determining that the input device is in contact with the touch apparatus; or when the input device determines that the input device is not in contact with the touch apparatus, detecting whether the input device is in contact with an object surface beyond the touch apparatus, and if the input device determines that the input device is in contact with the object surface, detecting, by the input device, a motion of the input device on the object surface, and sending information about the motion to the electronic device, to control the electronic device.

In this embodiment of the present disclosure, the input device integrates at least two modes, to resolve a problem of poor user experience caused because an input device on a current market has a single function. In addition, when the input device detects that the input device is in contact with the touch apparatus of the electronic device or the input device detects that the input device is in contact with the object surface beyond the touch apparatus of the electronic device, the input device enters a corresponding control mode for the electronic device. Therefore, the input device can conveniently switch between the two modes, to improve convenience of using the input device by a user, and improve user experience.

In some feasible implementations, the touch signal may be a capacitive touch signal, an electromagnetic touch signal, or an optical touch signal.

The "contact" in this embodiment of the present disclosure includes "contact" in a narrow sense and "contact" in a broad sense. In this embodiment of the present disclosure, the "contact" between the input device and the electronic device in a narrow sense means that the input device directly touches the electronic device, and the "contact" in a broad sense means that the input device is very close to the electronic device, so that unilateral or bilateral sensing may be performed, for example, floating touch. If the touch signal is the capacitive touch signal, the input device may be in contact with the electronic device through the "contact" in a narrow sense or in a broad sense, to sense the touch signal of the electronic device. If the touch signal is the electromagnetic touch signal or the optical touch signal, the input device may also be in contact with the electronic device through the "contact" in a narrow sense or in a broad sense, so that the input device detects the touch signal.

In some feasible implementations, the touch apparatus includes a touchpad or a touchscreen.

In some feasible embodiments, the touchscreen is a screen on which sensors are fully disposed, and is a screen that may be touched by using a component such as a digital pen, a finger, or a capacitive stylus to control the electronic device. The touchpad may not be a screen of the electronic device, for example, a touchpad on a notebook keyboard, and sensors are fully disposed on the touchpad, to sense touch of a component such as a digital pen, a finger, or a capacitive stylus, so as to control the electronic device.

In a first implementation of the first aspect of this embodiment of the present disclosure, the method includes: detecting, by the input device, a touch signal between the input device and the touch apparatus. If the input device detects that the touch signal exists and signal strength of the touch signal is high enough, the input device may consider that the input device is in contact with the touch apparatus, and the input device enters a first mode. In the first mode, the input device sends a first signal to the electronic device, so that the electronic device determines a position of the input device on the touch apparatus by using the first signal.

If the input device detects no touch signal, or detects that the signal strength is not high enough, the input device transmits a first optical detection signal. If the input device detects that reflection strength of a reflected signal that is of the first optical detection signal and that is on the object surface meets the preset condition, the input device enters a second mode. In the second mode, the input device transmits a second optical detection signal, a reflected signal of the second optical detection signal is reflected on the object surface, the input device determines the motion of the input device on the object surface based on the reflected signal, and the input device sends the information about the motion to the electronic device by using a wired signal, a Bluetooth signal, or a Wi-Fi signal, so that the electronic device can determine and execute a corresponding instruction based on the information about the motion.

In some feasible implementations, the first optical detection signal or the second optical detection signal is an infrared signal or a Blu-ray signal. In some embodiments, the first optical signal and the second optical signal may be transmitted by a same optical transmission device.

In some feasible implementations, the input device may further detect a signal of a positioning apparatus of the electronic device, and the second optical detection signal sent by the input device adapts to the signal of the positioning apparatus of the electronic device. If the input device detects the signal of the positioning apparatus, the input device enters a third mode, and in the third mode, the input device may control the electronic device by using the positioning apparatus.

The input device may automatically detect different modes, and enter different modes based on the detection, so that a user conveniently uses the input device in different scenarios and based on different requirements, and user experience is improved.

In a second implementation of the first aspect of this embodiment of the present disclosure, in the first mode, when the input device is in contact with the touch apparatus of the electronic device, and the input device controls the electronic device by using the touch apparatus, the input device may further obtain pressure information of the contact with the touch apparatus by using a pressure sensor, and send the pressure information to the electronic device, so that the electronic device may execute a corresponding instruction based on the pressure information.

In some feasible implementations, the input device may send the pressure information to the electronic device through Bluetooth or Wi-Fi.

The input device sends the pressure information to the electronic device, so that the electronic device can determine the corresponding instruction based on the pressure information. Therefore, information exchange between the input device and the electronic device is more diversified, and a user controls the electronic device more conveniently by using the input device.

In a third implementation of the first aspect of this embodiment of the present disclosure, the method includes: when the input device detects that the input device is in contact with the object surface beyond the touch apparatus, detecting, by the input device, an operation action of a user, where the operation action may be moving the input device based on a preset action, tapping at least one button of the input device in preset order, or sending a function switching signal to the input device by using the electronic device; and determining, by the input device, an operation function based on the operation action, where the operation function may be a paintbrush function and a mouse function. In the second mode, when the input device is in contact with the object surface beyond the touch apparatus, if the input device performs the mouse function, a ratio of a displacement of the input device to a displacement of a cursor on the electronic device is 1:n, where n is any positive number; or if the input device performs the paintbrush function, the displacement ratio is 1:1.

Because the input device can perform the mouse function or the paintbrush function, the input device can be used in more manners, to better meet different user requirements. In addition, in the second mode, when the input device performs the mouse function, the ratio of the displacement of the input device to the displacement of the cursor on the electronic device is 1:n, where n is any positive number; or when the input device performs the paintbrush function, the displacement ratio is 1:1. This just complies with features of the mouse function and the paintbrush function, so that the user uses the input device more handily. In addition, because the mouse function and the paintbrush function may be switched in three manners, the switching can be performed conveniently, and user experience is improved.

A second aspect of an embodiment of the present disclosure provides an electronic device control method, including: detecting, by an input device, a capacitive touch signal of a touchscreen of an electronic device, where if the capacitive touch signal is detected and signal strength of the capacitive touch signal is greater than a preset strength value, the input device enters a first mode, and in the first mode, the input device is in contact with the touchscreen, so that the capacitive touch signal of the touchscreen changes, and the touchscreen determines a position of the input device.

In some feasible implementations, the input device may actively send a first signal to the touchscreen, so that the touchscreen determines the position of the input device on the touchscreen by using the first signal, and touch control precision is improved.

In some feasible implementations, in the first mode, when the input device is in contact with the touch apparatus, the input device may further obtain pressure information of the contact with the touch apparatus by using a pressure sensor, and send the pressure information to the electronic device, so that the electronic device may execute a corresponding instruction based on the pressure information.

If the input device detects no capacitive touch signal of the touchscreen, or detects that the signal strength of the capacitive touch signal is not high enough, the input device enters a second mode. In the second mode, the input device transmits an optical infrared signal, a reflected signal of the infrared signal is reflected on the object surface, the input device detects the reflected signal, and if the reflected signal is detected and signal strength is high enough, the input device determines that the input device is enough close to or is in contact with the object surface. In this case, when moving on the object surface, the input device may determine a motion on the object surface by transmitting an infrared signal, and send information about the motion to the electronic device by using a wired signal, a Bluetooth signal, or a Wi-Fi signal, so that the electronic device executes a corresponding instruction based on the information about the motion.

In some feasible implementations, the information about the motion of the input device may include displacement information of the input device on a two-dimensional plane or in three-dimensional space, and may further include motion information of contact and leaving of the input device on the object surface, so that the touch device supports operation functions such as "tap", "double tap", and "slide".

When the electronic device has another type of positioning apparatus, the input device may further detect a signal of the positioning apparatus of the electronic device, and if the signal of the positioning apparatus is detected, may control the electronic device by using the positioning apparatus. In some feasible embodiments, the input device may preferentially detect the touch signal, and detect the signal of the positioning apparatus when no touch signal is detected or the signal strength of the detected touch signal is lower than preset strength.

When the input device detects an operation action performed by a user, the input device may determine an operation function based on the operation action, where the operation action may be an operation action determined by moving the input device based on a preset action, an operation action determined by tapping at least one button of the input device in preset order, or an operation action determined by sending a function switching signal to the input device by using the electronic device, and the operation function may be a paintbrush function and a mouse function. In the second mode, when the input device is in contact with the object surface beyond the touch apparatus, if the input device performs the mouse function, a ratio of a displacement of the input device to a displacement of a cursor on the electronic device is 1:n, where n is any positive number; or if the input device performs the paintbrush function, the displacement ratio is 1:1.

A third aspect of an embodiment of the present disclosure provides an input device, including: a processor, a detector, a positioner, and a transceiver, where the detector is configured to detect contact between the input device and a touch apparatus of an electronic device or contact between the input device and an object surface beyond the touch apparatus of the electronic device; and when the detector detects that the input device is in contact with the touch apparatus of the electronic device, the processor enables the positioner to control the electronic device by using the touch apparatus; or when the detector detects that the input device is in contact with the object surface beyond the touch apparatus, the detector detects a motion of the input device on the object surface, and the processor enables the transceiver to send, to the electronic device, information about the motion detected by the detector, to control the electronic device.

In a first implementation of the third aspect of this embodiment of the present disclosure, in some embodiments, the detector includes a first detection module, where the first detection module is specifically configured to detect a touch signal of the touch apparatus, and the processor determines whether signal strength of the touch signal is greater than a preset strength value. When the first detection module detects that the positioner is in contact with the touch apparatus, the positioner further sends a first signal to the touch apparatus, so that the touch apparatus determines a position of the input device on the touch apparatus by using the first signal.

In some embodiments, the detector further includes a second detection module, where when the first detection module detects no touch signal of the touch apparatus or detects that the signal strength of the touch signal does not meet a preset condition, the second detection module transmits a first optical detection signal, and detects reflection strength of a reflected signal that is of the first optical detection signal and that is on the object surface, and the processor determines whether the reflection strength meets the preset condition.

In some embodiments, the input device integrates at least two modes, to resolve a problem of poor user experience caused because an input device on a current market has a single function. In addition, when the input device detects that the input device is in contact with the touch apparatus of the electronic device or the input device detects that the input device is in contact with the object surface beyond the touch apparatus of the electronic device, the input device enters a corresponding control mode for the electronic device. Therefore, the input device can conveniently switch between the two modes, to improve convenience of using the input device by a user, and improve user experience.

With reference to the first implementation of the third aspect of this embodiment of the present disclosure, in a second implementation, the detector further includes a third detection module, where when the processor determines whether the reflection strength detected by the second detection module meets the preset condition, the third detection module transmits a second optical detection signal, and receives a reflected signal that is of the second optical detection signal and that is on the object surface. The processor is further configured to determine the motion of the input device on the object surface based on the reflected signal.

In some feasible embodiments, the transceiver may send, to the electronic device in a manner such as a wired signal, a Bluetooth signal, or a Wi-Fi signal, the information about the motion that is on the object surface and that is determined by the processor.

The input device may automatically detect different modes, and enter different modes based on the detection, so that a user conveniently uses the input device in different scenarios and based on different requirements, and user experience is improved.

In a third implementation of the third aspect of this embodiment of the present disclosure, in a first mode, when the input device is in contact with the touch apparatus of the electronic device, and the input device controls the electronic device by using the touch apparatus, the input device may further include a pressure sensor.

The pressure sensor obtains pressure information of the contact with the touch apparatus, and sends the pressure information to the electronic device by using the transceiver, so that the electronic device may execute a corresponding instruction based on the pressure information.

In some feasible implementations, the transceiver may send the pressure information to the electronic device through Bluetooth or Wi-Fi.

The input device sends the pressure information to the electronic device, so that the electronic device can determine the corresponding instruction based on the pressure information. Therefore, information exchange between the input device and the electronic device is more diversified, and a user controls the electronic device more conveniently by using the input device.

In a fourth implementation of the third aspect of this embodiment of the present disclosure, the input device further includes a function switcher, configured to detect an operation action performed by a user on the input device. The processor further determines an operation function based on the operation action. When the second detection module detects that the input device is in contact with the object surface beyond the touch apparatus of the electronic device, the transceiver further sends the information about the motion of the input device and the operation function to the electronic device, so that the electronic device determines a displacement ratio based on the operation function, and determines, based on the information about the motion and the displacement ratio, a displacement identified on the electronic device.

In some feasible embodiments, the function switcher includes at least one motion sensor or at least one button, where the at least one motion sensor is configured to detect moving performed by the user on the input device based on a preset action, to determine the operation action; or the at least one button is configured to receive tapping performed by the user in preset order, to determine the operation action.

In some feasible embodiments, when the transceiver receives a function switching signal sent by the user by using the electronic device, the function switcher may determine the operation action based on the function switching signal.

Because the input device can perform a mouse function or a paintbrush function, the input device can be used in more manners, to better meet different user requirements. In addition, in a second mode, when the input device performs the mouse function, a ratio of a displacement of the input device to a displacement of a cursor on the electronic device is 1:n, where n is any positive number; or when the input device performs the paintbrush function, the displacement ratio is 1:1. This just complies with features of the mouse function and the paintbrush function, so that the user uses the input device more handily. In addition, because the mouse function and the paintbrush function may be switched in three manners, the switching can be performed conveniently, and user experience is improved.

A fourth aspect of an embodiment of the present disclosure provides an input device, including: one or more processors, a memory, and one or more application programs. The one or more programs are stored in the memory, the one or more programs include an instruction, and when the instruction is executed by the input device, the input device is enabled to perform the method according to any embodiment in the first aspect.

A fifth aspect of the present disclosure provides a computer-readable storage medium, where the computer-readable storage medium stores an instruction, and when the instruction runs on the input device, the input device is enabled to perform the method according to any embodiment in the first aspect.

A sixth aspect of the present disclosure provides a computer-readable storage medium, including an instruction, where when the instruction runs on an input device, the input device is enabled to perform the method according to any embodiment in the first aspect.

In the embodiments of the present disclosure, the input device may control the electronic device by using the touch apparatus, or may control the electronic device by detecting the motion of the input device on the object surface and sending the information about the motion to the electronic device. Therefore, the input device integrates at least two modes, to resolve a problem of poor user experience caused because an input device on a current market has a single function. In addition, when the input device detects that the input device is in contact with the touch apparatus of the electronic device or the input device detects that the input device is in contact with the object surface beyond the touch apparatus of the electronic device, the input device enters a corresponding control mode for the electronic device. Therefore, the input device can conveniently switch between the two modes, to improve convenience of using the input device by a user, and improve user experience.

BRIEF DESCRIPTION OF DRAWINGS

FIG. 1-1-2 is another schematic flowchart of an electronic device control method implemented on an input device end according to an embodiment of the present disclosure;

FIG. 1-2 is a schematic diagram of an embodiment of an input device 1-200;

FIG. 1-3 is a schematic diagram of another embodiment of an input device 1-200;

FIG. 1-4 is a schematic diagram of another embodiment of an input device 1-200;

FIG. 1-5 is a schematic architectural diagram of an interaction system of a terminal and a digital pen;

FIG. 1-6 is a schematic diagram of function modules of a digital pen 501;

FIG. 1-7 is a schematic diagram of components of a mobile phone;

FIG. 1-8 is a schematic diagram of a digital pen system 5022 of a terminal 502;

FIG. 2-1 is a schematic diagram of performing a mouse function on a terminal 502 by a digital pen 501 in an active pen mode;

FIG. 2-2 is a schematic diagram of nib floating for performing a mouse function in an active pen mode;

FIG. 2-3 is a schematic diagram of performing a paintbrush function on a terminal 502 by a digital pen 501 in an active pen mode;

FIG. 2-4 is a schematic diagram of nib floating for performing a paintbrush function in an active pen mode;

FIG. 3-1 is a schematic diagram of performing a mouse function on a terminal 502 by a digital pen 501 in a mode in which a touch pen is positioned by using an ultrasonic wave;

FIG. 3-2 is a schematic diagram of performing a paintbrush function on a terminal 502 by a digital pen 501 in a mode in which a touch pen is positioned by using an ultrasonic wave;

FIG. 4-1 is a schematic diagram of performing a mouse function on a terminal 502 by a digital pen 501 in an optical pen mode;

FIG. 4-2 is a schematic diagram of performing a paintbrush function on a terminal 502 by a digital pen 501 in an optical pen mode;

FIG. 4-3 is a schematic diagram of nib floating for performing a paintbrush function in an active pen mode, where no trace is left along a moving track of the paintbrush;

FIG. 5-1 is a schematic diagram of mode switching of a digital pen 501;

FIG. 5-2 is a schematic diagram of various switching manners of a digital pen 501;

FIG. 6-1 is a schematic flowchart of performing an operation on a terminal 502 by a user by using a digital pen 501;

FIG. 6-2-1 is a schematic diagram of performing a mouse function in an active pen mode;

FIG. 6-2-2 is a schematic diagram of nib floating for performing a mouse function in an active pen mode;

FIG. 6-2-3 is a schematic diagram of tapping an icon by a nib for performing a mouse function in an active pen mode;

FIG. 6-2-4 is a schematic diagram of performing a mouse function in a mode in which a touch pen is positioned by using an ultrasonic wave;

FIG. 6-2-5 is a schematic diagram of nib floating for performing a mouse function in a mode in which a touch pen is positioned by using an ultrasonic wave;

FIG. 6-2-6 is a schematic diagram of tapping an icon by a nib for performing a mouse function in a mode in which a touch pen is positioned by using an ultrasonic wave;

FIG. 6-3-1 is a schematic diagram of performing a paintbrush function in an active pen mode;

FIG. 6-3-2 is a schematic diagram of nib floating for performing a paintbrush function in an active pen mode;

FIG. 6-3-3 is a schematic diagram of performing a paintbrush function in a mode in which a touch pen is positioned by using an ultrasonic wave;

FIG. 6-3-4 is a schematic diagram of nib floating for performing a paintbrush function in a mode in which a touch pen is positioned by using an ultrasonic wave;

FIG. 6-4-1 is a schematic diagram of a sitting posture of a user during switching from an active pen mode/a mode in which a touch pen is positioned by using an ultrasonic wave to an optical pen mode;

FIG. 6-4-2 is a schematic diagram of a paintbrush mode in an optical pen mode used by a user;

FIG. 6-4-3 is a schematic diagram of nib floating in a paintbrush mode in an optical pen mode used by a user;

FIG. 6-5-1 is a schematic diagram of closing a drawing application by a user in an optical pen mode;

FIG. 6-5-2 is a schematic diagram of performing a mouse function by a digital pen 501 in an optical pen mode;

FIG. 7-1 is a schematic diagram of performing a mouse function on a non-touchscreen all-in-one machine/desktop computer 502 by a digital pen 501 in an optical pen mode;

FIG. 7-2 is a schematic diagram of performing a paintbrush function on a non-touchscreen all-in-one machine/desktop computer 502 by a digital pen 501 in an optical pen mode;

FIG. 7-3 is a schematic diagram of performing a paintbrush function on a non-touchscreen all-in-one machine/desktop computer 502 by a digital pen 501 in a mode in which a touch pen is positioned by using an ultrasonic wave;

FIG. 7-4 is a schematic diagram of performing a mouse function on a non-touchscreen all-in-one machine/desktop computer 502 by a digital pen 501 in a mode in which a touch pen is positioned by using an ultrasonic wave;

FIG. 7-5 is a schematic diagram of performing a mouse function on a touchscreen tablet computer 502 by a digital pen 501 in an optical pen mode;

FIG. 7-6 is a schematic diagram of performing a paintbrush function on a touchscreen tablet computer 502 by a digital pen 501 in an optical pen mode;

FIG. 7-7 is a schematic diagram of performing a paintbrush function on a touchscreen tablet computer 502 by a digital pen 501 in an optical pen mode;

FIG. 7-8 is a schematic diagram of performing a mouse function on a touchscreen tablet computer 502 by a digital pen 501 in an optical pen mode;

FIG. 7-9 is a schematic diagram of performing a mouse function on a mobile phone 502 having a mouse function, by a digital pen 501 in an optical pen mode;

FIG. 7-10 is a schematic diagram of performing a paintbrush function on a mobile phone 502 having a mouse function, by a digital pen 501 in an optical pen mode;

FIG. 7-11 is a schematic diagram of performing a mouse function on a touchscreen mobile phone 502 having no mouse function, by a digital pen 501 in an optical pen mode; and FIG. 7-12 is a schematic diagram of performing a paintbrush function on a touchscreen mobile phone 502 having no mouse function, by a digital pen 501 in an optical pen mode.

DESCRIPTION OF EMBODIMENTS

Embodiments of the present disclosure provide an electronic device control method and an input device, so that an input device can support to control an electronic device in a plurality of input modes, so as to control the electronic device.

The following clearly and completely describes the technical solutions in the embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "have", and any other variants mean to cover the non-exclusive inclusion, for example, a process, method, system, product, or device that includes a list of operations or units is not necessarily limited to those expressly listed operations or units, but may include other operations or units that are not expressly listed or inherent to such a process, method, system, product, or device.

In the embodiments of the present disclosure, an input device may contact a touch apparatus of an electronic device to control the electronic device, or may detect a motion of the input device on the object surface and send information about the motion to the electronic device, to control the electronic device. Therefore, the input device integrates at least two modes, to resolve a problem of poor user experience caused because an input device on a current market has a single function, so as to improve user experience.

Figure 1:
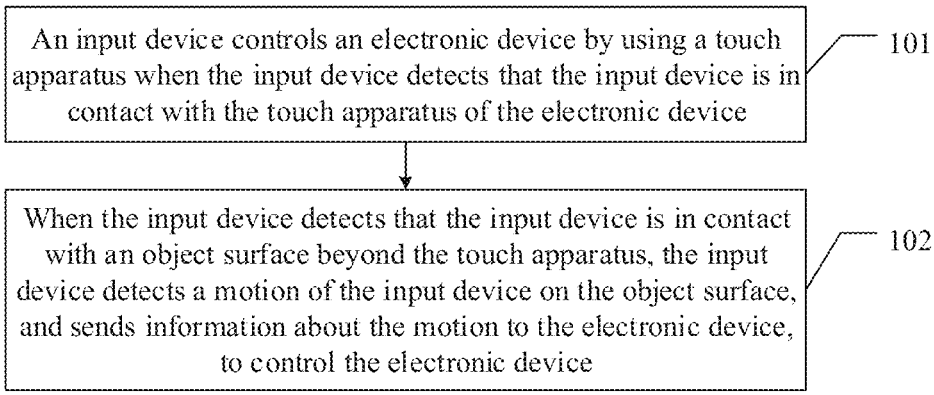
FIG. 1-1-1 is a schematic flowchart of an electronic device control method implemented on an input device end according to an embodiment of the present disclosure.

Based on the foregoing description, an embodiment of the present disclosure provides an electronic device control method implemented on an input device end. FIG. 1-1-1 shows an electronic device control method implemented on an input device end according to an embodiment of the present disclosure. The method includes operation 101 and operation 102.

Specifically: Operation 101. The input device controls an electronic device by using a touch apparatus when the input device detects that the input device is in contact with the touch apparatus of the electronic device. Operation 102. When the input device detects that the input device is in contact with an object surface beyond the touch apparatus, the input device detects a motion of the input device on the object surface, and sends information about the motion to the electronic device, to control the electronic device.

In this embodiment of the present disclosure, the input device may control the electronic device by using the touch apparatus, or may control the electronic device by detecting the motion of the input device on the object surface and sending the information about the motion to the electronic device. Therefore, the input device integrates at least two modes, to resolve a problem of poor user experience caused because an input device on a current market has a single function. In addition, when the input device detects that the input device is in contact with the touch apparatus of the electronic device or the input device detects that the input device is in contact with the object surface beyond the touch apparatus of the electronic device, the input device enters a corresponding mode for controlling the electronic device. Therefore, the input device can conveniently switch between the two modes, to improve convenience of using the input device by a user, and improve user experience.

Figures 1, 2:
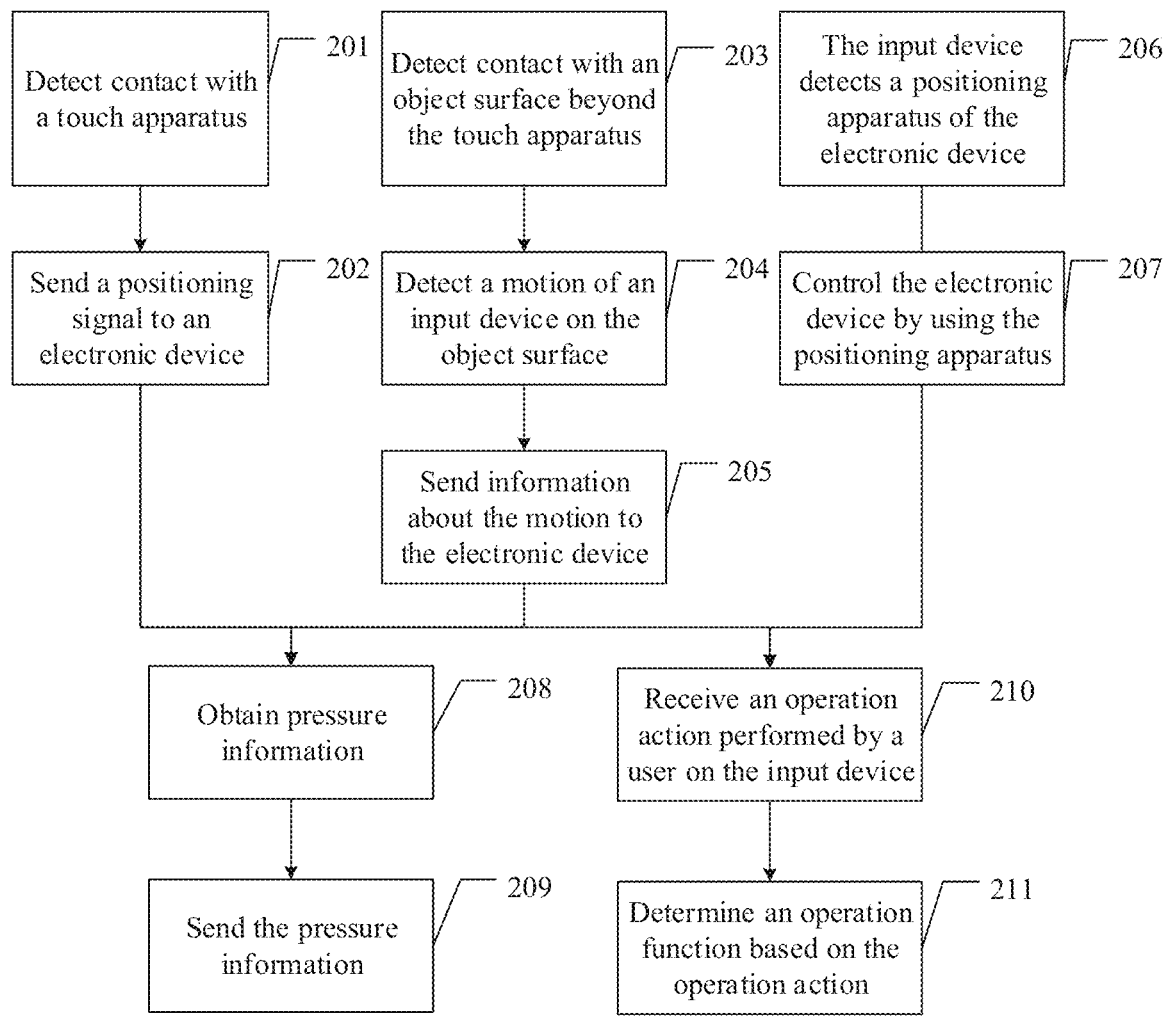
Figures 1, 2:
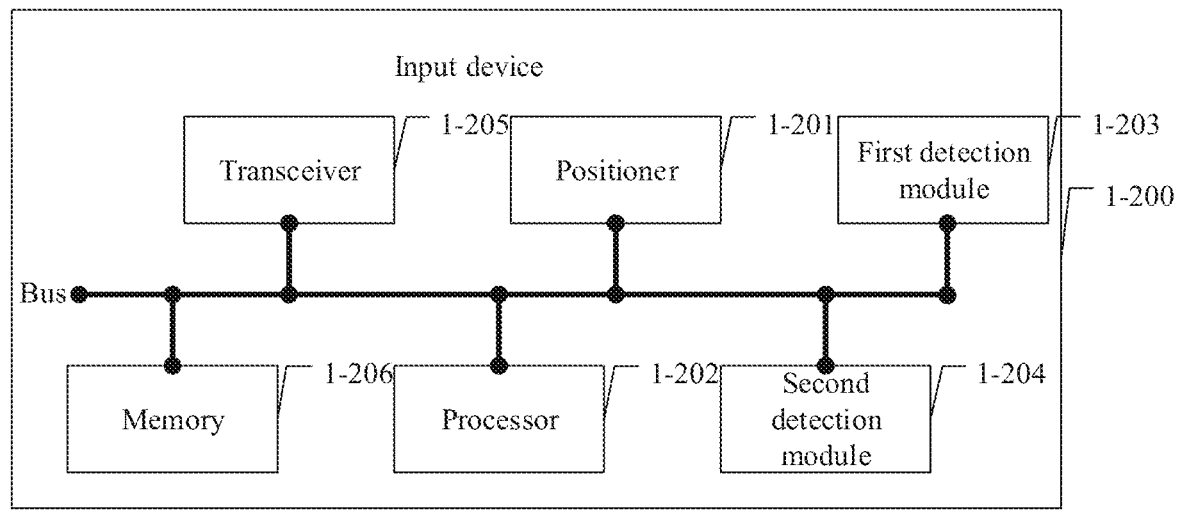

For ease of understanding, the following describes a specific procedure in the embodiment of the present disclosure. FIG. 1-1-2 is a schematic flowchart of an electronic device control method implemented on an input device end. The method includes operation 201 to operation 211.

Operation 201. An input device detects contact with a touch apparatus of an electronic device.

The input device is one of main apparatuses for exchanging information between a user and a computer system. A shape of the input device described in the present disclosure may be similar to a digital pen or a mouse, and is not limited herein. In some embodiments and accompanying drawings of the present disclosure, an example in which the input device is a digital pen is used for illustration. The electronic device may be various terminals, servers, or the like, and is not limited herein. Touch apparatuses of some electronic devices may include a touchpad or a touchscreen.

In this embodiment of the present disclosure, the contact between the input device and the touch apparatus of the electronic device may be contact in a narrow sense. To be specific, the input device directly touches the touch apparatus of the electronic device. Alternatively, the contact between the input device and the touch apparatus of the electronic device may be contact in a broad sense. To be specific, the input device and the touch apparatus of the electronic device do not directly touch each other, but approach each other, so that the input device and the touch apparatus may implement mutual sensing by using corresponding built-in modules, or implement unilateral sensing, for example, floating touch. This is not limited herein. When the "contact" is detected, the input device may enter a first mode. In the first mode, the input device controls the electronic device by using the touch apparatus.

In some feasible embodiments, the touch signal may be one of a capacitive touch signal, an electromagnetic touch signal, or an optical touch signal, or may be a combination thereof, to improve touch detection precision.

If the touch signal is the capacitive touch signal, the touch apparatus is a capacitive touchscreen. When the input device is in contact with the touch apparatus in a narrow sense by using a positioner, if a current flows into the positioner, the current is the touch signal. If strength of the touch signal is greater than a preset strength value, the input device enters the first mode.

If the touch signal is the electromagnetic touch signal, the touch apparatus is an electromagnetic touchscreen, and a positioner of the input device has an electromagnetic sensing function. When the positioner is in contact with the touch apparatus in a broad sense, if the input device can sense an electromagnetic signal of the touch apparatus by using the positioner, the electromagnetic signal is the touch signal. If strength of the touch signal is greater than a preset strength value, the input device enters the first mode.

It should be noted that, the touch apparatus may have both a function of the capacitive touchscreen and a function of the electromagnetic touchscreen, so that when the input device floats above the touch apparatus, the input device and the touch apparatus can still sense each other due to the function of the electromagnetic touchscreen. In this way, the first mode is determined and control is further performed. When the input device is in contact with the touch apparatus in a narrow sense, positioning may be performed by using the function of the capacitive touchscreen.

If the touch signal is the optical touch signal, the input device may send an optical signal to the touch apparatus, and a reflected signal that is of the optical signal and that is on the touch apparatus is used as the touch signal.

Operation 202. The input device controls the electronic device by using the touch apparatus.

In some embodiments, when the input device is in contact with the touch apparatus, the input device may affect the touch signal of the touch apparatus based on a feature of the input device, so that the touch apparatus detects a contact position of the input device. For example, the input device affects a touch scanning signal of a capacitive touch apparatus based on a conductive feature, to change the detection scanning signal of the capacitive touch apparatus, so that the touch apparatus can determine a contact position of the input device based on the change.

In some embodiments of the present disclosure, the input device sends a first signal to the electronic device. To be specific, when the touch signal is detected, and the strength of the touch signal is greater than the preset strength value, the input device may enter the first mode. In the first mode, when the input device is in contact with the touch apparatus, the input device may send the first signal to the electronic device.

In this embodiment of the present disclosure, the first signal sent by the input device matches the touch signal of the touch apparatus.

In some embodiments, the touch apparatus is the capacitive touchscreen, and the input device may send a current signal to the touch apparatus. The touch signal of the touch apparatus changes due to impact of the current signal. In this case, the touch apparatus can detect the position at which the input device is in contact with the touch apparatus.

In some other embodiments, the touch apparatus is the electromagnetic touchscreen, and the input device may send an electromagnetic signal to the touch apparatus. In this case, the touch apparatus uses the electromagnetic signal as the first signal, and the electromagnetic touchscreen can detect the electromagnetic signal, and determine the position of the input device on the electromagnetic touchscreen based on the electromagnetic signal.

In still some other embodiments, if the touch apparatus is an optical touchscreen, the input device may detect a motion of the input device by using an optical signal, and send information about the motion to the electronic device. In this case, the electronic device uses the information about the motion as the first signal, and determines the position of the input device based on the information about the motion. The optical first signal may be a laser or a Blu-ray different from a natural light.

The electronic device determines the position of the input device on the touch apparatus by using the first signal, and may execute a corresponding instruction based on the position, for example, determining a position of a cursor, a position of a paintbrush, or control in another form. This is not limited herein.

Operation 203. The input device detects whether the input device is in contact with an object surface beyond the touch apparatus.

In some feasible embodiments, if the input device detects no touch signal of the touch apparatus, or detects that the signal strength of the touch signal does not meet a preset condition, the input device transmits a first optical detection signal, to detect whether the input device is in contact with the object surface beyond the touch apparatus. Specifically, if the input device detects that reflection strength of a reflected signal that is of the first detection signal and that is on the object surface meets the preset condition, the input device determines that the input device is in contact with the object surface beyond the touch apparatus. The object surface is, for example, a desktop, a mouse pad, or a book surface. This is not limited herein.

Operation 204. The input device detects a motion of the input device on the object surface.

If the input device detects whether the input device is in contact with the object surface beyond the touch apparatus, the input device may transmit a second optical detection signal, to determine the motion of the input device on the object surface by using a reflected signal that is of the second optical detection signal and that is on the object surface.

Operation 205. Send information about the motion to the electronic device, to control the electronic device.

When obtaining the information about the motion of the input device, the input device may send the information about the motion to the electronic device by using a wired signal, a Bluetooth signal, or a Wi-Fi signal, and the electronic device may execute a corresponding instruction based on the information about the motion. It should be noted that the first optical detection signal and/or the second optical detection signal may be an infrared signal or a Blu-ray signal.

In some other embodiments, the input device may send the obtained information about the motion of the input device by using another communications apparatus of the electronic device. For example, if the input device is connected to the electronic device in a wired manner, the input device may send the information about the motion through a wired connection. Alternatively, the input device may send the information about the motion in another manner such as a wireless connection. Details are not described herein.

Operation 206. The input device detects a positioning apparatus of the electronic device.

In this embodiment of the present disclosure, the input device may further have a third mode. To be specific, when the electronic device has no touch apparatus, but has a built-in positioning apparatus or an external positioning apparatus, if the input device is in contact with the electronic device, the input device enters the third mode. In some feasible embodiments, the input device may preferentially detect the touch signal, and detect a signal of the positioning apparatus when no touch signal is detected or the signal strength of the detected touch signal is lower than preset strength.

Operation 207. The input device controls the electronic device by using the positioning apparatus.

In the third mode, the input device may send a second signal to the positioning apparatus of the electronic device, so that the electronic device determines a position of the input device by using the positioning apparatus, and determines a position on a screen and a corresponding instruction based on the position. For example, the input device is a digital pen, and the electronic device is a terminal. The terminal may have a built-in positioning apparatus or an external positioning apparatus. When the digital pen is in contact with the terminal, the digital pen can send an identifiable second signal (namely, a positioning signal) to the positioning apparatus, so that the terminal determines a position at which the digital pen is in contact with the terminal. In some embodiments, the positioning apparatus may have two or more built-in ultrasonic wave receive ports, receive ultrasonic signals sent by a nib of the digital pen, and determine a specific position of the nib on the screen based on distances measured by using different ports receiving the ultrasonic signals.

In this embodiment of the present disclosure, the input device integrates at least two modes, to resolve a problem of poor user experience caused because an input device on a current market has a single function. In addition, when the input device detects that the input device is in contact with the touch apparatus of the electronic device or the input device detects that the input device is in contact with the object surface beyond the touch apparatus of the electronic device, the input device enters a corresponding mode for controlling the electronic device. Therefore, the input device can conveniently switch between the two modes, to improve convenience of using the input device by a user, and improve user experience. In addition, the input device may automatically detect different modes, and enter different modes based on the detection, so that a user conveniently uses the input device in different scenarios and based on different requirements, and user experience is improved.

It should be noted that, in some feasible embodiments, if the input device has all functions in operation 201 to operation 207, operation 201 may be preferentially performed. When the input device detects that the input device is not in contact with the touch apparatus, operation 206 is performed. If no positioning apparatus is detected, operation 203 is performed. In other words, a priority of the operations is: operation 201, operation 206, operation 203. For example, when the electronic device is a terminal, the touch apparatus and the positioning apparatus are a screen of the terminal, and such a priority sequence can ensure that a user preferentially controls the terminal on the screen of the terminal. In addition, it should be further noted that, in some feasible embodiments, when operation 201 is performed, operation 202 may be performed subsequently. When operation 203 is performed, operation 204 and operation 205 may be performed subsequently. When operation 206 is performed, operation 207 may be performed subsequently. From another perspective, operation 201, operation 203, and operation 206 is used to detect a specific mode that is to be used by the input device in a current scenario. After the to-be-used mode is determined, functions in the mode are separately performed in operation 202, operation 204 and operation 205, and operation 207.

Operation 208. The input device obtains pressure information of the contact with the touch apparatus by using a pressure sensor.

In some embodiments of the present disclosure, the positioner of the input device may further have a built-in pressure sensor. When a user is in contact with a touchscreen by using the positioner of the input device, the user may obtain the pressure information. The pressure information reflects a use force of the user. In this way, operation function diversity is improved.

Operation 209. The input device sends the pressure information to the electronic device, to control the electronic device.

In this embodiment of the present disclosure, a pressure detection apparatus may be disposed on the input device, to detect pressure information between the input device and a contact object, and send the pressure information to the electronic device by using a wired or wireless communications module, for example, a radio frequency module (such as Bluetooth or Wi-Fi), so that the electronic device executes a corresponding instruction. If the input device is currently a digital pen having a paintbrush function, the pressure information may be reflected in a trace size and a color shade. This is not limited herein.

The input device sends the pressure information to the electronic device, so that the electronic device can determine the corresponding instruction based on the pressure information. Therefore, information exchange between the input device and the electronic device is more diversified, and a user controls the electronic device more conveniently by using the input device.

Operation 210. The input device receives an operation action performed by the user on the input device.

In some feasible embodiments, the input device may control the electronic device to perform a plurality of functions. For example, a digital pen may perform a mouse function and a paintbrush function. When different functions need to be performed, switching needs to be performed. In this embodiment of the present disclosure, switching may be performed in the following manner: receiving, by the input device, moving performed by the user on the input device based on a preset action, receiving, by at least one button of the input device, tapping performed by the user in preset order, or receiving, by the input device, a function switching signal sent by the user by using the electronic device.

Operation 211. The input device determines an operation function based on the operation action.

In some feasible embodiments, in an example in which the input device is a digital pen, the operation function may include a mouse function and a paintbrush function. The mouse function means that the digital pen controls a mouse cursor of the electronic device, and the paintbrush function means that the digital pen controls a paintbrush in a drawing application on the electronic device. To achieve optimal drawing experience, when the paintbrush function is performed, a displacement ratio of a motion displacement of the digital pen to a motion displacement of the paintbrush may be 1:1. However, when the mouse function is performed, there may be no such a limitation. In other words, the displacement ratio may be 1:n, where n is any positive number.

Because the input device can perform the mouse function or the paintbrush function, the input device can be used in more manners, to better meet different user requirements. In addition, in a second mode, when the input device performs the mouse function, a ratio of a displacement of the input device to a displacement of a cursor on the electronic device is 1:n, where n is any positive number; or when the input device performs the paintbrush function, the displacement ratio is 1:1. This just complies with features of the mouse function and the paintbrush function, so that the user uses the input device more handily. In addition, because the mouse function and the paintbrush function may be switched in three manners, the switching can be performed conveniently, and user experience is improved.

In this embodiment of the present disclosure, when the input device detects that the input device is in contact with the object surface beyond the touch apparatus, and the input device determines the mouse function or the paintbrush function, the input device may send the information about the motion of the input device and the operation function to the electronic device, so that the electronic device determines the displacement ratio based on the operation function, and determines, based on the information about the motion and the displacement ratio, a displacement identified on the electronic device.

It should be noted that, for various modes of the input device, a function in operation 208 and operation 209 may be used, a function in operation 210 and operation 211 may be used, and there is no time sequence relationship between the two functions. In other words, a time sequence relationship may exist between operation 208 and operation 209, operation 209 may be performed after operation 208, and operation 211 may be performed after operation 210. However, operation 208 may be performed before operation 210, or operation 208 may be performed after operation 210. This is not limited herein.

The foregoing describes the electronic device control method implemented on an input device end according to this embodiment of the present disclosure. The following describes an input device 1-200 according to an embodiment of the present disclosure. Referring to FIG. 1-2, an embodiment of the input device 1-200 according to this embodiment of the present disclosure includes a positioner 1-201, a processor 1-202, a detector including a first detection module 1-203 and a second detection module 1-204, a transceiver 1-205, and a memory 1-206.

The input device 1-200 may be in contact with a touch apparatus of an electronic device or an object surface beyond the touch apparatus. The contact herein may be contact in a narrow sense. Then, the first detection module 1-203 detects whether the input device 1-200 is in contact with the touch apparatus of the electronic device. When the contact is detected, the input device may enter a first mode, and in the first mode, the processor 1-202 may control the electronic device by using the touch apparatus. If the first detection module 1-203 detects no touch signal of the touch apparatus, or the processor 1-202 determines that signal strength of the detected touch signal does not meet a preset condition, the second detection module 1-204 may detect whether the positioner 1-201 is in contact with an object surface beyond the touch apparatus of the electronic device, and after it is detected that the input device 1-200 is in contact with the object surface, the positioner 1-201 detects a motion of the input device 1-200 on the object surface. If the motion is detected, the processor 1-202 may determine information about the motion, and send the information about the motion to the electronic device by using the transceiver 1-205, to control the electronic device. Specifically, the information about the motion may be sent to the electronic device by using a wired signal, a Bluetooth signal, or a Wi-Fi signal. When performing the foregoing functions, the processor 1-202 may use a program and data that are stored in the memory 1-206.

Figures 1, 2, 3:
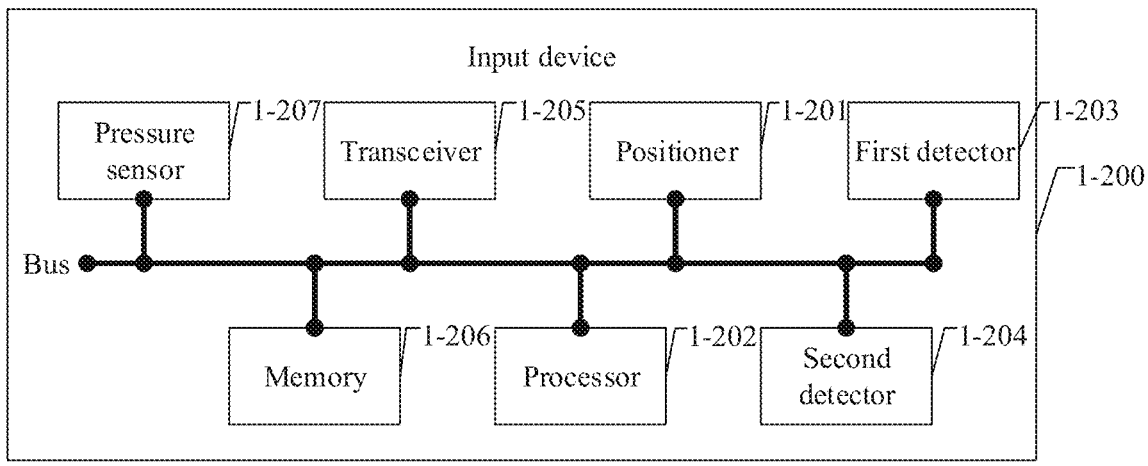

FIG. 1-3 shows another implementation of the input device 1-200 according to this embodiment of the present disclosure. Details include: The first detection module 1-203 detects a touch signal of the touch apparatus, so that the processor 1-202 determines whether signal strength of the touch signal is greater than a preset strength value. If the touch signal is detected and the signal strength is greater than the preset strength value, the input device 1-200 enters a first mode, and in the first mode, the transceiver 1-205 sends a first signal to the touch apparatus, so that the touch apparatus determines a position of the positioner on the touch apparatus by using the first signal.

When the first detection module 1-203 detects no touch signal of the touch apparatus, or detects that the signal strength of the touch signal does not meet a preset condition, the second detection module 1-204 transmits a first optical detection signal, to detect reflection strength of a reflected signal that is of the first optical detection signal and that is on the object surface. The processor 1-202 is further configured to determine whether the reflection strength meets the preset condition, and if the preset condition is met, the input device 1-200 enter a second mode. In the second mode, the second detection module 1-204 transmits a second optical detection signal, and receives a reflected signal that is of the second optical detection signal and that is on the object surface, so that the processor 1-202 determines a motion of the input device 1-200 on the object surface based on the reflected signal. In some feasible embodiments, the transceiver is specifically configured to send information about the motion to the electronic device by using a wired signal, a Bluetooth signal, or a Wi-Fi signal.

In this embodiment of the present disclosure, the input device 1-200 integrates at least two modes, to resolve a problem of poor user experience caused because an input device 1-200 on a current market has a single function. In addition, when the input device 1-200 detects that the input device 1-200 is in contact with the touch apparatus of the electronic device or the input device 1-200 detects that the input device 1-200 is in contact with the object surface beyond the touch apparatus of the electronic device, the input device 1-200 enters a corresponding control mode for the electronic device. Therefore, the input device 1-200 can conveniently switch between the two modes, to improve convenience of using the input device 1-200 by a user, and improve user experience.

In a third implementation of the third aspect of this embodiment of the present disclosure, in the first mode, when the input device 1-200 is in contact with the touch apparatus of the electronic device, and the input device 1-200 controls the electronic device by using the touch apparatus, the input device 1-200 may further include a pressure sensor 1-207, and the pressure sensor 1-207 may obtain pressure information of the contact with the touch apparatus, and send the pressure information to the electronic device by using the transceiver 1-205. In some feasible implementations, the transceiver 1-205 may send the pressure information to the electronic device through Bluetooth or Wi-Fi. The input device 1-200 sends the pressure information to the electronic device, so that the electronic device can determine a corresponding instruction based on the pressure information. Therefore, information exchange between the input device 1-200 and the electronic device is more diversified, and a user controls the electronic device more conveniently by using the input device 1-200.

FIG. 1-4 is a schematic diagram of another embodiment of the input device 1-200. The input device 1-200 further includes a function switcher 1-208.

The function switcher 1-208 is configured to detect an operation action performed by a user on the input device 1-200, so that the processor 1-202 determines an operation function based on the operation action. When the second detection module 1-204 detects that the input device 1-200 is in contact with the object surface beyond the touch apparatus of the electronic device, the transceiver 1-205 is used to send the information about the motion of the input device 1-200 and the operation function to the electronic device, so that the electronic device determines a displacement ratio based on the operation function, and determines, based on the information about the motion and the displacement ratio, a displacement identified on the electronic device. The function switcher 1-208 may include: at least one motion sensor 1-2081, configured to detect moving performed by the user on the input device 1-200 based on a preset action, to determine the operation action; or at least one button 1-2082, configured to receive tapping performed by the user in preset order, to determine the operation action. Alternatively, the function switcher 1-208 receives, by using the transceiver 1-205, a function switching signal sent by the user by using the electronic device, to determine the operation action. Because the input device 1-200 can perform a mouse function or a paintbrush function, the input device 1-200 can be used in more manners, to better meet different user requirements. In addition, in the second mode, when the input device 1-200 performs the mouse function, a ratio of a displacement of the input device 1-200 to a displacement of a cursor on the electronic device is 1:n, where n is any positive number; or when the input device 1-200 performs the paintbrush function, the displacement ratio is 1:1. This just complies with features of the mouse function and the paintbrush function, so that the user uses the input device 1-200 more handily. In addition, because the mouse function and the paintbrush function may be switched in three manners, the switching can be performed conveniently, and user experience is improved.

The foregoing provides the description from perspectives of a method procedure and a function apparatus. The following provides a description with reference to a specific embodiment. In the embodiment, an example in which the electronic device is a terminal, the touch apparatus is a touchscreen, and the input device is a digital pen is used for description. FIG. 1-5 is a schematic architectural diagram of an interaction system of a terminal and a digital pen. The interaction system includes a terminal 502 and a digital pen 501.

In this embodiment of the present disclosure, a structure of the digital pen 501 may include a body device and a nib. The nib is used as a positioner of the digital pen 501. A shape of the body device of the digital pen 501 may be a pen in a stick shape, a finger cot shape, or a mobile phone shape. Any shape that can implement a function of the body device is available. A pen in the stick shape is used as an example for description in this specification.

In this embodiment of the present disclosure, that the digital pen 501 controls the terminal 502 by using a touchscreen may also mean that the digital pen 501 enters an active pen mode. In the active pen mode, the digital pen 501 may contact or approach a touch apparatus of an electronic device by using the nib, to control the terminal 502. It should be noted that the terminal 502 may be a notebook computer, a desktop computer, a mobile phone, or the like.

In this embodiment of the present disclosure, the digital pen 501 may have three modes. In the present disclosure, a first mode, a second mode, and a third mode respectively correspond to the active pen mode, an optical pen mode, and a mode in which a touch pen is positioned by using an ultrasonic wave. In the active pen mode, the digital pen 501 is in contact with the screen of the touchscreen terminal 502 by using the nib, to implement an operation on a cursor. In the optical pen mode, the digital pen 501 is in contact with a desktop 503 or an object at another position by using the nib, to implement an operation on a cursor on the screen. In the mode in which a touch pen is positioned by using an ultrasonic wave, when the digital pen 501 is in contact with the screen of the non-touchscreen terminal 502 by using the nib, a position of the digital pen 501 on the screen is positioned by using an ultrasonic wave, to implement an operation on a cursor on the screen. It should be noted that, the mouse function and the paintbrush function may be used in all the three modes. In some scenarios, if a user writes on a notebook computer for a long time, the user may feel relatively tired due to sitting in a same posture, and the user may switch the digital pen 501 to the optical pen mode function, to implement an operation on the cursor on the desktop 503, so as to change the sitting posture. In addition, because the three modes are integrated into one digital pen 501, the user does not need to change the digital pen 501, so that time is saved and efficiency is improved. In addition, when going out, the user does not need to carry a mouse or another digital pen 501, and needs to carry only one digital pen 501.

In some feasible embodiments, in an operating system, some terminals 502 have cursors, but some other terminals 502 have no cursor. When the operating system of the terminal 502 has the cursor, the digital pen 501 may be in contact with the screen by using the nib, and a position at which the screen is in contact with the nib is a position of the cursor. When the nib approaches the screen, the screen senses a position of the nib in a magnetic field to determine a corresponding position, and uses the position as the position of the cursor. When the operating system of the terminal 502 has no cursor, the digital pen 501 may contact or approach the screen by using the nib, to slide the screen and tap an icon, so as to implement an operation such as a shortcut function. This is not limited herein.

In some feasible embodiments, there is a pressure sensor at the nib. The digital pen 501 is connected to the terminal 502 in a wired or wireless manner, and may transmit information sensed by the pressure sensor to the terminal 502, so that the terminal 502 determines a position of the digital pen 501, a trace, and other information that needs to be determined. Function modules may include an active pen module, an optical pen module, and a module for positioning a touch pen by using an ultrasonic wave, and separately support the active pen mode, the optical pen mode, and the mode in which a touch pen is positioned by using an ultrasonic wave that are of the digital pen 501.

FIG. 1-6 is a schematic diagram of function modules of a digital pen 501. In this embodiment of the present disclosure, various modules may be integrated into one integrated circuit, or may be classified into a plurality of circuits.

An active pen module 5012 may include a nib+detection module 50121 and a first controller 50122. The nib+detection module 50121 is configured to sense a touch signal when contacting a touchscreen. If the touch signal is sensed, the digital pen 501 may enter an active pen mode; or if no touch signal is detected, the digital pen 501 enters another mode. In addition, in the active pen mode, the digital pen 501 is in contact with the touchscreen by using the nib+detection module 50121, to detect a touch signal, so that a terminal 502 determines a position of the nib+detection module 50121 on the touchscreen, and determines and executes a corresponding instruction based on the position. The touch signal may be a capacitive touch signal. When the nib is in contact with the touchscreen through "contact" in a narrow sense, the nib receives a current from the capacitive touchscreen, and uses the current as the touch signal. The touch signal may alternatively be an electromagnetic touch signal. When the nib is in contact with the touchscreen through "contact" in a broad sense, the nib senses an electromagnetic signal sent by the touchscreen, and uses the electromagnetic signal as the touch signal. When the touch signal is an optical touch signal, and the nib is in contact with the touchscreen through "contact" in a broad sense, the nib may transmit an optical signal, and use a reflected signal as the touch signal.

An optical pen module may include a photodiode+laser transmitter 50131, an optical module 50122, and a second controller 50133. The photodiode+laser transmitter 50131 is configured to transmit a laser to a contact object. The optical module 50132 is configured to receive a light reflected by the object, use the light as a touch signal, and transmit information obtained based on the light to the terminal 502 by using the second controller 50133, so that the terminal 502 determines a position of the digital pen based on the obtained information.

A module 5011 for positioning a touch pen by using an ultrasonic wave may include an ultrasonic reflector 50111, an infrared transmitter 50112, and a third controller 50113. When switching to a mode function in which a touch pen is positioned by using an ultrasonic wave, the digital pen 501 sends an infrared ray to the terminal 502, to activate at least two ultrasonic receivers 5021 of the terminal 502. In this case, the digital pen 501 may send ultrasonic signals to the at least two ultrasonic receivers 5021 by using the nib, so that the terminal 502 determines a position of the nib on the touchscreen.

In some feasible embodiments, the nib of the digital pen may further have a built-in pressure sensor. When the nib is pressed, the pressure sensor senses pressure, and transmits pressure information to a processor. The processor transmits the pressure information to the terminal 502 through Bluetooth. When receiving the pressure information, the terminal 502 may determine a corresponding instruction. For example, when the digital pen 501 performs a paintbrush function, pressure sensing may be a basis for a color shade and width of a paintbrush. When the digital pen 501 performs a mouse function, whether pressure is sensed may be used as a basis for determining whether to perform tapping.

Specifically, the digital pen 501 may preferentially detect the touch signal. When the touch signal is detected and signal strength is greater than a preset strength value, the digital pen 501 may consider that the digital pen 501 is in contact with the touchscreen, and enter the active pen mode. When no touch signal is detected or the signal strength of the detected touch signal is not greater than the preset strength value, the digital pen 501 detects a signal of a positioning apparatus, and if the signal is detected and strength is greater than the preset strength value, the digital pen 501 may consider that the digital pen 501 is in contact with a non-touchscreen of the terminal 502, and enter the mode in which a touch pen is positioned by using an ultrasonic wave; or if no signal is detected or the strength is not greater than the preset strength value, the digital pen 501 may detect whether strength of an optical signal is greater than the preset value. If the strength of the optical signal is greater than the preset value, the digital pen 501 may consider that the digital pen 501 is in contact with an object surface beyond the screen, and enter an optical pen mode.

In some feasible embodiments, the digital pen 501 may further include a button 5019, Bluetooth 5015, and another sensor, for example, a six-axis sensor 5020. The button 5019 may be a physical button or a virtual button, may be used for switching between a mouse function and a paintbrush function, may be used for activation, may be used for switching between three modes, and may be used as a left button, a right button, a scroll wheel, and another function button. This is not limited herein. The Bluetooth 5015 is configured to be wirelessly connected to the terminal 502. In some feasible embodiments, the Bluetooth 5015 may alternatively be connected to the terminal 502 in a wired manner or another wireless manner, for example, Wi-Fi. This is not limited herein. In some feasible embodiments, the sensor may include the six-axis sensor 5020. The six-axis sensor 5020 is a motion sensor module, includes a three-axis gyroscope and a three-axis accelerometer, and may provide a pen movement status and gesture detection for a processor 5016. The six-axis sensor 5020 may also be used for another purpose, for example, sensing a signature action of a user and collecting motion information and speed information to determine user information. This is more accurate than a method in which authentication is performed only by sensing a signature by using pressure. In some feasible embodiments, the digital pen 501 may further include a display module 5018 and an audio module 5017. The display module 5018 may include an LED screen, configured to: display a current mode and function to a user, or display information such as a battery level or a time to a user. This is not limited herein. The audio module 5017 is configured to report Bluetooth enabling, a battery level, an alarm clock, or other information to the user. This is not limited herein. In some feasible embodiments, the digital pen 501 may perform a plurality of functions such as a mouse function and a paintbrush function in a process of controlling the terminal 502. The mouse function means that the digital pen 501 controls a mouse cursor of the electronic device, and the paintbrush function means that the digital pen 501 controls a paintbrush in a drawing application on the electronic device. To achieve optimal drawing experience, when the paintbrush function is performed, a displacement ratio of a motion displacement of the digital pen 501 to a motion displacement of the paintbrush may be 1:1. However, when the mouse function is performed, there may be no such a limitation. In other words, the displacement ratio may be 1:n, where n is any positive number. When different functions need to be performed, switching needs to be performed. In this embodiment of the present disclosure, switching may be performed in the following manner: receiving, by the digital pen 501, moving performed by the user on the digital pen 501 based on a preset action, receiving, by at least one button 2019 of the digital pen 501, tapping performed by the user in preset order, or receiving, by the digital pen, a function switching signal sent by the user by using the terminal.

The terminal 502 in this embodiment of the present disclosure may include a mobile phone, a tablet computer, a personal digital assistant (PDA), a point of sale (POS) 502, an in-vehicle computer, a notebook computer, an all-in-one machine/a desktop computer, a multimedia player, a navigation device, an education device (a learning toy for children), a game system, a control device (a home controller or an industrial controller), or another type of terminal 502. For ease of description, only a part related to this embodiment of the present disclosure is shown. For specific technical details that are not disclosed, refer to the method parts in the embodiments of the present disclosure. The following uses a mobile phone as an example of the terminal 502 for description, and the mobile phone may include components such as a radio frequency (RF) circuit, a memory, an input unit, a display unit, a sensor, an audio circuit, a wireless fidelity (Wi-Fi) module, a processor, and a power supply. A person skilled in the art may understand that the notebook computer structure described above constitutes no limitation, and may include more or fewer components, combine some components, or have different component arrangements.

FIG. 1-7 is a schematic diagram of components of a mobile phone. Details are as follows:

An RF circuit C-10 may be configured to: send and receive signals in an information sending and receiving process or a call process, and in particular, after receiving downlink information of a base station, send the downlink information to a processor C-80 for processing; and send related uplink data to the base station. Usually, the RF circuit C-10 includes but is not limited to an antenna, at least one amplifier, a transceiver, a coupler, a low noise amplifier (LNA), a duplexer, and the like. In addition, the RF circuit C-10 may further communicate with a network and another device through wireless communication. Any communication standard or protocol may be used for the wireless communication, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

A memory C-20 may be configured to store a software program and a module. The processor C-80 performs various function applications of the mobile phone and data processing by running the software program and the module stored in the memory C-20. The memory C-20 may mainly include a program storage area and a data storage area. The program storage area may store an operating system, an application program required by at least one function (such as a sound playing function or an image playing function), and the like. The data storage area may store data (such as audio data and a phone book) created based on use of the mobile phone, and the like. In addition, the memory C-20 may include a high-speed random access memory, and may further include a non-volatile memory, for example, at least one magnetic disk storage device, a flash storage device, or another volatile solid-state storage device.

An input unit C-30 may be configured to: receive entered digit or character information, and generate key signal input related to user settings and function control of the mobile phone. Specifically, the input unit C-30 may include a touch panel C-31 and another input device C-32. The touch panel C-31, also referred to as a touchscreen, may collect a touch operation performed by a user on or near the touch panel (for example, an operation performed by the user on or near the touch panel C-31 by using any suitable object or accessory such as a finger or a stylus), and may drive a corresponding connection apparatus based on a preset program. In one embodiment, the touch panel C-31 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, then sends the touch point coordinates to the processor C-80, and can receive and perform a command sent by the processor C-80. In addition, the touch panel C-31 may be implemented by using a plurality of types such as a resistive type, a capacitive type, an infrared ray, and a surface acoustic wave. In addition to the touch panel C-31, the input unit C-30 may further include the another input device C-32. Specifically, the another input device C-32 may include but be not limited to one or more of a physical keyboard, a function key (such as a volume control key or an on/off key), a trackball, a mouse, a joystick, and the like.

A display unit C-40 may be configured to display information entered by the user or information provided for the user, and various menus of the mobile phone. The display unit C-40 may include a display panel C-41. In one embodiment, the display panel C-41 may be configured in a form of a liquid crystal display (LCD), an organic light-emitting diode (OLED), or the like. Further, the touch panel C-31 may cover the display panel C-41. When detecting the touch operation on or near the touch panel C-31, the touch panel C-31 transmits the touch operation to the processor C-80 to determine a type of a touch event, and then the processor C-80 provides corresponding visual output on the display panel C-41 based on the type of the touch event. Although the touch panel C-31 and the display panel C-41 are used as two independent parts in FIG. 1-3 to implement input and output functions of the mobile phone, in some embodiments, the touch panel C-31 and the display panel C-41 can be integrated to implement the input and output functions of the mobile phone.

The mobile phone may further include at least one sensor C-50, such as a light sensor, a motion sensor, and another sensor. Specifically, the light sensor may include an ambient light sensor and a proximity sensor. The ambient light sensor may adjust luminance of the display panel C-41 based on brightness of ambient light. The proximity sensor may turn off the display panel C-41 and/or backlight when the mobile phone approaches to an ear. As one type of the motion sensor, an accelerometer sensor may detect values of acceleration in all directions (usually, three axes), may detect a value and a direction of gravity when the accelerometer sensor is stationary, and may be used in an application for identifying a mobile phone posture (such as screen switching between a landscape mode and a portrait mode, a related game, or magnetometer posture calibration), a function related to vibration identification (such as a pedometer or a stroke), and the like. Another sensor such as a gyroscope, a barometer, a hygrometer, a thermometer, or an infrared sensor may be further configured in the mobile phone. Details are not described herein.

An audio circuit C-60, a loudspeaker C-61, and a microphone C-62 may provide an audio interface between the user and the mobile phone. The audio circuit C-60 may receive audio data, convert the audio data into an electrical signal, and transmit the electrical signal to the loudspeaker C-61, and the loudspeaker C-61 converts the electrical signal into a sound signal for output. In addition, the microphone C-62 converts a collected sound signal into an electrical signal. The audio circuit C-60 receives and converts the electrical signal into audio data, and then outputs the audio data to the processor C-80 for processing. The processor C-80 sends the audio data to, for example, another mobile phone by using the RF circuit C-10, or outputs the audio data to the memory C-20 for further processing.

Wi-Fi belongs to a short-range wireless transmission technology. With a Wi-Fi module C-70, the mobile phone can help the user receive and send emails, browse web pages, access streaming media, and the like. The Wi-Fi module C-70 provides wireless broadband Internet access for the user. Although FIG. 1-3 shows the Wi-Fi module C-70, it may be understood that the Wi-Fi module C-70 is not a mandatory composition of the mobile phone, and may be omitted based on a requirement without changing the essential scope of the present disclosure.

The processor C-80 is a control center of the mobile phone, uses various interfaces and lines to connect all parts of the entire mobile phone, and performs various functions and data processing of the mobile phone by running or executing the software program and/or the module that are/is stored in the memory C-20 and invoking data stored in the memory C-20, to monitor the entire mobile phone. In one embodiment, the processor C-80 may include one or more processing units. Preferably, an application processor and a modem processor may be integrated into the processor C-80. The application processor mainly processes an operating system, a user interface, an application program, and the like. The modem processor mainly processes wireless communication. It may be understood that, alternatively, the modem processor may not be integrated into the processor C-80.

The mobile phone further includes a power supply C-90 (such as a battery) that supplies power to each component. Preferably, the power supply may be logically connected to the processor C-80 by using a power management system, to implement functions such as charging management, discharging management, and power consumption management by using the power management system.

Although not shown, the mobile phone may further include a camera, a Bluetooth module, and the like. Details are not described herein.

FIG. 1-8 is a schematic diagram of a digital pen system 5022 of a terminal. The digital pen 501 may be in the structure shown in FIG. 1-6. The digital pen system 5022 includes a system 50221 for positioning a touch pen by using an ultrasonic wave, an active pen system 50222, and an optical pen system 50223. Correspondingly, the system 50221 for positioning a touch pen by using an ultrasonic wave, the active pen system 50222, and the optical pen system 50223 support a mode in which a touch pen is positioned by using an ultrasonic wave, an active pen mode, and an optical pen mode that are of the digital pen 501, and respectively interact with a module 501-1 for positioning a touch pen by using an ultrasonic wave, an active pen module 501-2, and an optical pen module 501-3 that are of the digital pen 501.

The system 50221 for positioning a touch pen by using an ultrasonic wave includes a receiver 502211, configured to receive an ultrasonic wave and an infrared ray that are sent by the digital pen 501 in the mode in which a touch pen is positioned by using an ultrasonic wave. When the infrared ray is received, an ultrasonic module is started. The ultrasonic module includes two ultrasonic receive ports. When the digital pen 501 performs an operation on a screen, the two ultrasonic receive ports separately determine distances, and determine a specific position of a nib on the screen based on the two different distances, to control a cursor. It should be noted that the system 50221 for positioning a touch pen by using an ultrasonic wave and the active pen system 50222 are usually not on a same terminal 502, because the system 50221 for positioning a touch pen by using an ultrasonic wave is usually used on a non-touchscreen terminal 502, and the system 50221 for positioning a touch pen by using an ultrasonic wave may be an external device, while the active pen system 50222 includes a touchscreen, and the touchscreen is usually embedded, and may be used on a touchscreen terminal 502. The position of the nib is sensed by using the touchscreen, to determine a position of the cursor. Specifically, the active pen system 50222 includes a touchscreen, and the touchscreen interacts with the active pen mode of the digital pen 501 by using a capacitance principle. The optical pen system 50223 includes a transceiver 502231, configured to exchange information with the digital pen 501. The transceiver 502331 may be Bluetooth, Wi-Fi, or another device. This is not limited herein. When the digital pen 501 is pressed or moves to obtain information, the information may be sent to the terminal 502. The terminal 502 may receive the information by using the transceiver 502231, to obtain information about the digital pen 501 in the optical pen mode, so as to determine the position of the cursor on the screen.

The following separately describes interaction between the terminal 502 and the digital pen 501 in the three modes and related specific implementations.

1. Active Pen Mode

FIG. 2-1 is a schematic diagram of performing a mouse function on a terminal 502 by a digital pen 501 in an active pen mode. In this embodiment of the present disclosure, an example in which the terminal 502 is a touchscreen notebook computer is used. In this embodiment of the present disclosure, a user may perform an operation on a cursor on the touchscreen terminal 502 by using a function of the active pen mode. When the mouse function is performed, a nib of the digital pen 501 leaves no trace when sliding on a screen, and the cursor keeps following the nib. In this embodiment of the present disclosure, the digital pen 501 may have a left button, a right button, a scroll wheel, and another game-related button that are of a mouse. This is not limited herein.

In some feasible embodiments, when the nib of the digital pen 501 leaves the screen, if there is a specific distance between the nib and the screen, the touchscreen can still sense a position of the nib of the digital pen 501 by using a capacitance, and the cursor can be still controlled. Specifically, FIG. 2-2 is a schematic diagram of nib floating for performing a mouse function in an active pen mode. It should be noted that, when the distance between the nib of the digital pen 501 and the screen exceeds a threshold, the terminal 502 may not be capable of sensing the digital pen 501, and the cursor cannot be positioned based on the position of the nib of the digital pen 501.

Figures 1, 2, 3, 4:
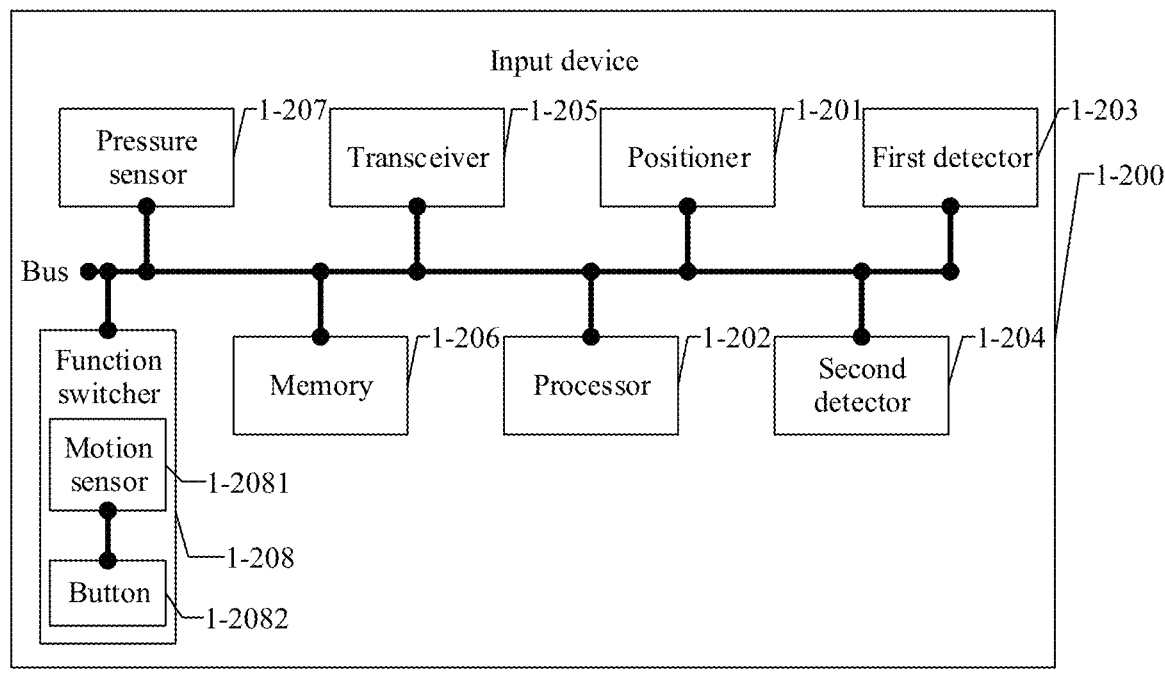

FIG. 2-3 is a schematic diagram of performing a paintbrush function on a terminal 502 by a digital pen 501 in an active pen mode. When a user uses drawing software, writing software, or any other software that needs to obtain a real writing trace of a person, the digital pen 501 may perform the paintbrush function in the active pen mode. In this case, a nib of the digital pen 501 draws in a drawing frame of drawing software on the screen, and a brushwork in the software keeps following the nib of the digital pen 501, to form a trace. In some feasible embodiments, when the nib of the digital pen 501 leaves the screen, if there is a specific distance between the nib and the screen, the touchscreen can still sense a position of the nib of the digital pen 501 by using a capacitance, and the brushwork can be still controlled. However, no trace is formed, and only a cursor is displayed under the nib. Specifically, FIG. 2-4 is a schematic diagram of nib floating for performing a paintbrush function in an active pen mode.

In some feasible embodiments, when the paintbrush function is performed, an eraser function may be set at a pen cap, the nib, or another part of the digital pen 501. The eraser function may be used to erase the trace, fade the trace, or clean the trace. This is not limited herein. In some feasible embodiments, the nib may further have a pen feel, a ballpoint pen feel, a pencil feel, an alloy (metal "ink") pen feel, or a writing brush feel, or may have another feel. This is not limited herein. In some feasible embodiments, when the brushwork leaves the drawing frame, and appears at a position beyond the drawing frame on the screen, the paintbrush function of the digital pen 501 may be automatically switched to a mouse function. When the brushwork enters the drawing frame again, the mouse function may be automatically switched to the paintbrush function. In some feasible embodiments, switching may be performed by using a button, switching may be performed by shaking a pen, or switching may be performed by using another feasible solution. This is not limited herein. In some feasible embodiments, the digital pen 501 may alternatively be a capacitive pen, which is also referred to as a passive pen. The capacitive pen is an assistant device for simulating a human body (usually a finger) by using a conductor material to complete human computer interaction.

2. Mode in Which a Touch Pen is Positioned by Using an Ultrasonic Wave

In this embodiment of the present disclosure, if a screen of a terminal 502 is a non-touchscreen, the terminal 502 cannot position a nib by using a capacitance on the screen. FIG. 3-1 is a schematic diagram of performing a mouse function on a terminal 502 by a digital pen 501 in a mode in which a touch pen is positioned by using an ultrasonic wave. In this embodiment of the present disclosure, the terminal 502 may receive, by using an infrared and ultrasonic receiver 5021, an infrared ray and an ultrasonic wave sent by the digital pen 501, to position the nib on the screen. In some feasible embodiments, the receiver 5021 may be externally connected to the terminal 502, or may be built in the terminal 502. This is not limited herein. The receiver 5021 may be connected to the terminal 502 in a wireless or wired manner. This is not limited herein.

In this embodiment of the present disclosure, a pressure apparatus may be disposed at the nib. When the nib slightly presses the screen, a connection of a signal of the nib is triggered, and the ultrasonic wave and the infrared ray are sent to the receiver 5021. In some feasible embodiments, a function of the infrared ray is equivalent to that of an optical control switch. There is an infrared receiver 5021 on the receiver 5021. When the infrared receiver 5021 receives an infrared beam from the pen, an ultrasonic receiver 5021 starts working. Because a speed of light and a speed of the ultrasonic wave have a very large difference, the speed of light may be ignored. At a moment when the infrared ray is received, a time is 0. Then, two ultrasonic receive ports of the receiver 5021 successively receive ultrasonic waves transmitted by the pen, and the two ultrasonic receive ports separately record arrival times, so as to obtain the times at which the ultrasonic waves of the nib arrive at the two receivers 5021, speeds of the ultrasonic waves, and a distance between the two receivers 5021. Therefore, distances can be obtained based on the times and the speeds. In this case, three edge lengths of a triangle including the two receivers 5021 and a transmitter are known, so that coordinates of that point can be calculated. In this way, coordinates of each point are calculated, and a path is formed. This path is a touch path. In some feasible embodiments, the position of the nib of the digital pen 501 on the screen may be alternatively determined in another manner. This is not limited herein. In some feasible embodiments, because no special protection processing is usually performed on the screen of the non-touchscreen terminal 502, a small soft brush similar to a writing brush may be used at the nib. Softness is moderate, so that the screen can be well protected without affecting a touch feel. Therefore, when the digital pen 501 is used on a computer screen, the screen is not damaged.

Because the digital pen sends pressure information to the terminal, the terminal may determine a corresponding instruction based on the pressure information, so that information exchange between the digital pen and the terminal is more diversified, and a user can control the terminal more conveniently by using the digital pen.

FIG. 3-2 is a schematic diagram of performing a paintbrush function on a terminal 502 by a digital pen 501 in a mode in which a touch pen is positioned by using an ultrasonic wave. Details are not described herein.

3. Optical Pen Mode

In this embodiment of the present disclosure, when a digital pen 501 performs a function in the optical pen mode, a principle of the digital pen 501 may be similar to that of an optical mouse. A laser is reflected to a reflection object (for example, a desktop 503) and a light reflected by the reflection object is received for positioning. Specifically, FIG. 4-1 is a schematic diagram of performing a mouse function on a terminal 502 by a digital pen 501 in an optical pen mode. In this embodiment of the present disclosure, when the digital pen 501 is in the optical pen mode, the digital pen 501 may control a cursor at any position, for example, a book desk, a mouse pad, a screen, a book, or a thigh. It should be noted that, when the digital pen 501 performs the mouse function in the optical pen mode, a ratio of a displacement of a nib of the digital pen 501 to a displacement of the cursor on the screen may be set, for example, 1:n, where n is a positive number, and n may be greater than 1, may be less than 1, or may be equal to 1. This is not limited herein.

In this embodiment of the present disclosure, when the digital pen 501 performs a paintbrush function, a paintbrush may draw on the screen by moving the nib on a desktop 503. For details, refer to FIG. 4-2. FIG. 4-2 is a schematic diagram of performing a paintbrush function on a terminal 502 by a digital pen 501 in an optical pen mode. In this embodiment of the present disclosure, to help a user achieve better drawing or writing experience, a displacement of using the digital pen 501 by the user on the desktop 503 may be consistent with a displacement of the cursor on the screen, namely, 1:1.

In some feasible embodiments, when the nib of the user leaves the screen, the terminal 502 of the user may further use a 3D engine technology, so that the digital pen 501 transmits a laser to the desktop 503. When a height of the digital pen 501 relative to the desktop 503 is within a preset range (for example, 25 millimeters), the cursor in a drawing frame may further be controlled by moving the digital pen 501. The cursor may leave no trace when moving, and the cursor is only controlled. In some feasible embodiments, a trace may be still left. This is not limited herein. Specifically, FIG. 4-3 is a schematic diagram of nib floating for performing a paintbrush function in an active pen mode, where no trace is left along a moving track of the paintbrush.

In the embodiments of the present disclosure, the digital pen integrates three modes, to resolve a problem of poor user experience caused because an input device on a current market has a single function. In addition, the digital pen can conveniently switch between the three modes, to improve convenience of using the input device by a user, and improve user experience.

4. Mode Switching

Figures 1, 2, 3, 4, 5:
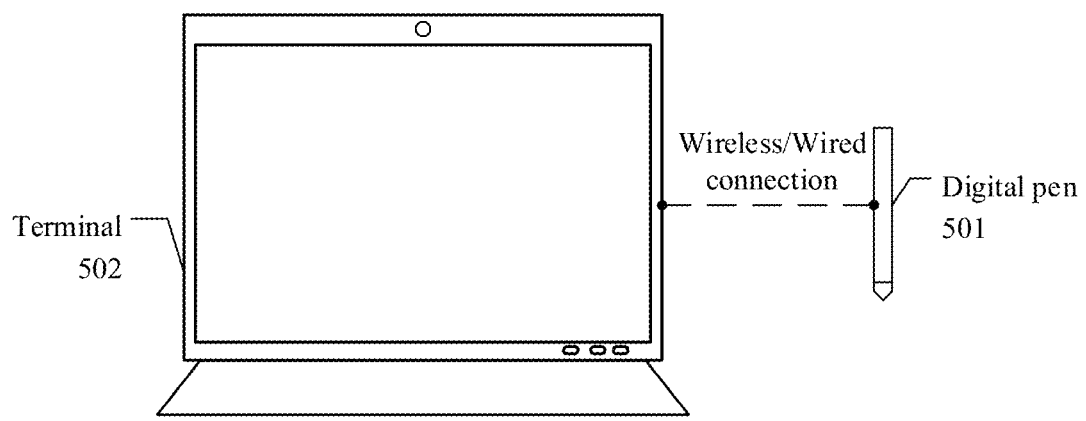

In some feasible embodiments, a digital pen 501 may further have a standby mode. This is not limited herein. In this case, the digital pen 501 may switch between the foregoing plurality of modes. Interaction between the digital pen 501 and the terminal 502 is described in detail above. The following describes switching of the digital pen 501 between various modes. Specifically, FIG. 5-1 is a schematic diagram of mode switching 5-1 of a digital pen 501. Modes for switching of the digital pen 501 include an active pen mode 5-1-1, an optical pen mode 5-1-2, a mode 5-1-3 in which a touch pen is positioned by using an ultrasonic wave, and a standby mode 5-1-4. Any operation function 5-1-5 in the active pen mode 5-1-1, the optical pen mode 5-1-2, and the mode 5-1-3 in which a touch pen is positioned by using an ultrasonic wave may further be switched between a mouse mode 5-1-5-1 and a paintbrush mode 5-1-5-2. It should be noted that, when the terminal 502 is a touchscreen terminal 502, the digital pen 501 may switch between the active pen mode 5-1-1 and the optical pen mode 5-1-2. When the terminal 502 is a non-touchscreen terminal 502, the digital pen 501 may switch between the mode 5-1-3 in which a touch pen is positioned by using an ultrasonic wave and the optical pen mode 5-1-2.

In some feasible embodiments, when the digital pen 501 is in contact with a touchscreen of the terminal 502, the contact may be contact in a narrow sense, to be specific, the digital pen 501 directly touches the touchscreen of the terminal 502; or may be contact in a broad sense, to be specific, mutual sensing or unilateral sensing between the digital pen 501 and the touchscreen is implemented through approaching. This is not limited herein. In some feasible embodiments, the touch signal includes one or more of a capacitive touch signal, an electromagnetic touch signal, or an optical touch signal. If the touch signal is the capacitive touch signal, the touchscreen is a capacitive touchscreen, for example, a capacitive touchscreen. When the digital pen 501 is in contact with the touchscreen in a narrow sense by using a positioner, if a current flows into the positioner, the current is the touch signal, and if strength of the touch signal is greater than a preset strength value, the digital pen 501 enters the active pen mode 5-1-1. If the touch signal is the electromagnetic touch signal, the touchscreen is an electromagnetic touchscreen, for example, an electromagnetic touchscreen, and a positioner of the digital pen 501 has an electromagnetic sensing function. When the positioner is in contact with the touchscreen in a broad sense, if the digital pen 501 can sense an electromagnetic signal of the touchscreen by using the positioner, the electromagnetic signal is the touch signal. If strength of the touch signal is greater than a preset strength value, the digital pen 501 enters the active pen mode 5-1-1. It should be noted that, the touchscreen may have both a function of the capacitive touchscreen and a function of the electromagnetic touchscreen, so that when the digital pen 501 floats above the touchscreen, the digital pen 501 and the touchscreen can still sense each other due to the function of the electromagnetic touchscreen. In this way, the active pen mode 5-1-1 is determined and control is further performed. When the digital pen 501 is in contact with the touchscreen in a narrow sense, positioning may be performed by using the function of the capacitive touchscreen. If the touch signal is the optical touch signal, the digital pen 501 may send an optical signal to the touchscreen, and a reflected signal that is of the optical signal and that is on the touchscreen is used as the touch signal.

In some feasible embodiments, if the digital pen 501 detects no touch signal of the touchscreen, or detects that the signal strength of the touch signal does not meet a preset condition, the digital pen 501 transmits a first optical detection signal, to detect whether the digital pen 501 is in contact with an object surface beyond the touchscreen. Specifically, if the digital pen 501 detects that reflection strength of a reflected signal that is of the first detection signal and that is on the object surface meets the preset condition, the digital pen 501 determines that the digital pen 501 is in contact with the object surface beyond the touchscreen. The object surface is, for example, a desktop 503, a mouse pad, or a book surface. This is not limited herein.

In this embodiment of the present disclosure, the digital pen 501 may further have the mode 5-1-3 in which a touch pen is positioned by using an ultrasonic wave. That is, when the terminal 502 has no built-in touchscreen and has only a built-in positioning apparatus or an external positioning apparatus, the digital pen 501 contacts the terminal 502, and the terminal 502 determines a position of the digital pen 501 by using the positioning apparatus, and determine a position on the screen and a corresponding instruction based on the position. When the digital pen 501 detects that the digital pen 501 is not in contact with the touchscreen and detects that the digital pen 501 is not in contact with the object surface, the positioning apparatus may be detected. Specifically, the terminal 502 sends an infrared ray or an ultrasonic wave by using the positioning apparatus, and if the digital pen 501 detects the infrared ray or the ultrasonic wave, the digital pen 501 may determine, based on the infrared ray or the ultrasonic wave, whether the positioning apparatus exists. If the positioning apparatus exists, the digital pen 501 switches to the mode 5-1-3 in which a touch pen is positioned by using an ultrasonic wave. In the mode 5-1-3 in which a touch pen is positioned by using an ultrasonic wave, when the digital pen 501 writes on the non-touchscreen terminal 502, the terminal 502 may have a built-in positioning apparatus or an external positioning apparatus, and the positioning apparatus may have two or more built-in ultrasonic wave receive ports, receive ultrasonic signals sent by a nib of the digital pen 501, and determine a specific position of the nib on the screen based on distances measured by using different ports receiving the ultrasonic signals.

The digital pen may automatically detect different modes, and enter different modes based on the detection, so that a user conveniently uses the input device in different scenarios and based on different requirements, and user experience is improved.

In some feasible embodiments, FIG. 5-2 is a schematic diagram of switching between various operation functions 5-1-6 of a digital pen 501. The digital pen 501 may control a terminal 502 to perform a plurality of functions. The digital pen 501 is used as an example. A mouse function and a paintbrush function may be performed. When different functions need to be performed, switching needs to be performed. In this embodiment of the present disclosure, switching may be performed in the following manners:

Switching 5-1-6-1 by using a gesture: The digital pen 501 receives moving performed by a user on the digital pen 501 based on a preset action. For example, the digital pen 501 is shaken back and forth, or a circle is drawn in the air, so that a built-in motion sensor senses preset motion information, and a corresponding function, such as a mouse function or a paintbrush function, is determined based on the motion information. If the circle is drawn, the mouse function is performed. If shaking is performed twice back and forth, the paintbrush function is performed. This is not limited herein. Alternatively, after a preset action operation is performed, a function of the digital pen 501 is switched regardless of a current function. For example, the mouse function is performed currently, the paintbrush function is performed after shaking, and the mouse function is performed after shaking again. This is not limited herein.

Switching 5-1-6-2 by using a button/sensor: At least one button of the digital pen 501 receives tapping performed by a user in preset order. At least one button may be built in the digital pen 501, and different buttons determine different functions. In some feasible embodiments, a function switching button may be disposed, and switching is performed when the button is tapped once. In some feasible embodiments, two function buttons may be disposed, one button has a mouse function, and the other button has a paintbrush function. In some feasible embodiments, a touchscreen may be built in the digital pen 501, and interaction between a person and the digital pen 501 may be performed, so that a function is set on the touchscreen. This is not limited herein.

Switching 5-1-6-3 by receiving an instruction: The digital pen 501 receives a function switching signal sent by a user by using the terminal 502. In some feasible embodiments, the terminal 502 may send instruction information to the digital pen 501 by using a radio frequency module such as Bluetooth or Wi-Fi, so that the digital pen 501 performs switching. This is not limited herein.

Because the digital pen may perform the mouse function or the paintbrush function, the digital pen is used in more manners, to better meet different user requirements. In addition, in the second mode, when the digital pen performs the mouse function, a ratio of a displacement of the digital pen to a displacement of a cursor on the terminal is 1:n, where n is any positive number; or when the digital pen performs the paintbrush function, the displacement ratio is 1:1. This just complies with features of the mouse function and the paintbrush function, so that the user uses the digital pen more handily. In addition, because the mouse function and the paintbrush function may be switched in three manners, the switching can be performed conveniently, and user experience is improved.

The foregoing describes the interaction system of the terminal 502 and the digital pen 501 in detail. The following provides a description with reference to a specific example scenario.

5. Specific Scenario

Figures 1, 2, 3, 4, 5, 6:
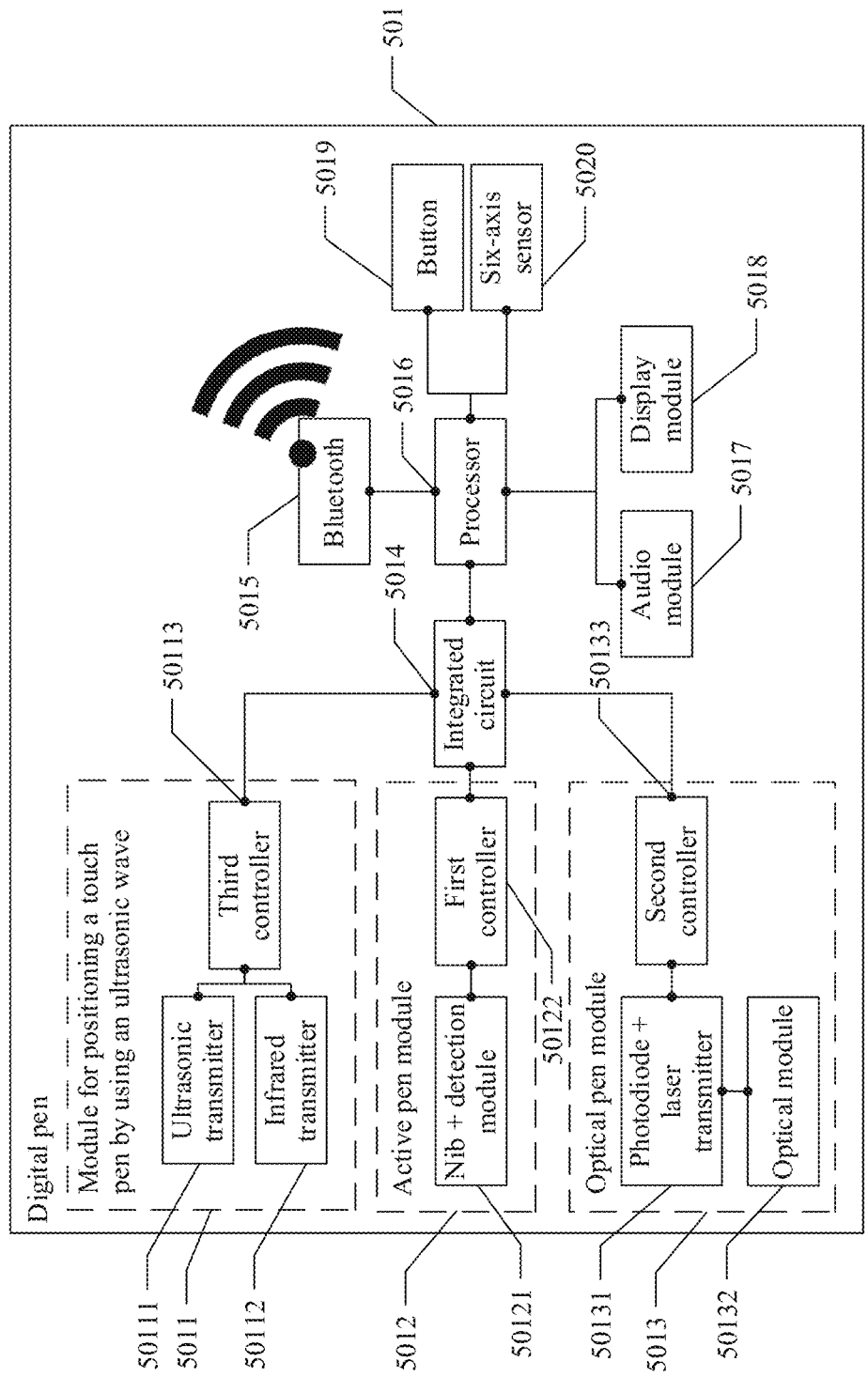

FIG. 6-1 is a schematic flowchart of performing an operation on a terminal 502 by a user by using a digital pen 501. Details are as follows:

Operation S1. Wake up the digital pen 501.

The terminal 502 used by a user Xiaochen is a touch-screen notebook computer. The notebook computer may be connected to the digital pen 501. Because the digital pen 501 has not been used for a long time, for example, several hours, the digital pen 501 may be in a standby state. In this case, Xiaochen may wake up the digital pen 501. In some feasible embodiments, when the digital pen 501 is woken up, the digital pen 501 may enter a default mode, for example, an active pen mode for performing a mouse function. It should be noted that the default mode may be another mode. This is not limited herein.

In some feasible embodiments, the digital pen 501 may be woken up as a computer is powered on, may be woken up by using a particular button or any button on the digital pen 501, may be woken up by shaking the digital pen 501 and enabling a motion sensor on the digital pen 501 to detect a motion, may be woken up by using an operation on the terminal 502, may be woken up by tapping a specific place by using a nib of the digital pen 501 and enabling the nib to sense pressure, may be woken up by using voice, or may be woken up in another manner. This is not limited herein. It should be noted that the digital pen 501 may be connected to the notebook computer in a wired or wireless manner. A wireless connection is used as an example herein for description.

Operation S2. The digital pen 501 performs the mouse function on a screen of the terminal 502.

When the digital pen 501 enters the active pen mode for performing the mouse function, FIG. 6-2-1 is a schematic diagram of performing a mouse function in an active pen mode. In this embodiment of the present disclosure, the nib of the digital pen 501 may control a cursor on the screen, may tap an icon on the screen of the notebook computer, and may use buttons such as a left button, a right button, and a scroll wheel. When the digital pen 501 floats above the screen in a specific distance, the nib of the digital pen 501 may be sensed through capacitance sensing of the screen. In other words, a position of the cursor may be positioned during "contact" in a broad sense. FIG. 6-2-2 is a schematic diagram of nib floating for performing a mouse function in an active pen mode. In this embodiment of the present disclosure, the notebook computer may sense, by using a capacitance on the screen, which the position of the cursor is on an icon of the application. However, because the digital pen 501 is not in contact with the screen, and no pressure on the nib of the digital pen 501 is detected, the icon may be displayed as "unselected". When the digital pen 501 taps the icon, FIG. 6-2-3 is a schematic diagram of tapping an icon by a nib for performing a mouse function in an active pen mode. The icon is selected, and then an operation may be performed on the application represented by the icon, for example, tapping the icon twice to open, right-tapping the icon to open a corresponding block diagram, slowly tapping the icon twice to re-name the icon, or another operation. This is not limited herein.

In some feasible embodiments, if the terminal 502 is a non-touchscreen terminal 502, for example, a non-touchscreen notebook computer, an infrared+ultrasonic receiver 5021 may be used, and the digital pen 501 enters a mode in which a touch pen is positioned by using an ultrasonic wave. FIG. 6-2-4 is a schematic diagram of performing a mouse function in a mode in which a touch pen is positioned by using an ultrasonic wave. When the nib of the digital pen 501 senses pressure, an infrared ray is sent to the receiver 5021, and the receiver 5021 is started, so that the receiver 5021 enables an ultrasonic module. Because the receiver

5021 has two ultrasonic receive ports, when ultrasonic waves sent by the digital pen 501 are received, distances to the nib of the digital pen 501 may be separately determined by using the two ultrasonic receive ports, and a two-dimensional position of the nib on the screen is determined based on the distances. In this way, a position of a cursor is determined, and the cursor is controlled. Similarly, when performing the mouse function in the mode in which a touch pen is positioned by using an ultrasonic wave, the digital pen 501 may tap an icon on the screen, or may use nib floating. FIG. 6-2-5 is a schematic diagram of nib floating for performing a mouse function in a mode in which a touch pen is positioned by using an ultrasonic wave. FIG. 6-2-6 is a schematic diagram of tapping an icon by a nib for performing a mouse function in a mode in which a touch pen is positioned by using an ultrasonic wave. Details are not described herein.

Operation S3. The digital pen 501 performs a paintbrush mouse function on the screen of the terminal 502.

The user Xiaochen taps the icon twice or processes the icon in another manner to open a drawing application, for example, tapping a button, and enters an interface of the drawing application. FIG. 6-3-1 is a schematic diagram of performing a paintbrush function in an active pen mode. On this interface, Xiaochen draws on the drawing application by switching the digital pen 501 to perform the paintbrush function in the active pen mode. In a drawing process, when moving in a drawing frame, the nib of the digital pen 501 leaves a trace. Different traces are left based on different color requirements. When the nib of the digital pen 501 leaves the drawing frame, if a distance to the screen is within a preset range, the terminal 502 can still sense the digital pen 501 by using the capacitance on the screen, and the cursor of the terminal 502 can still move with the nib of the digital pen 501, but no trace is left. FIG. 6-3-2 is a schematic diagram of nib floating for performing a paintbrush function in an active pen mode.

In some feasible embodiments, if the screen of the terminal 502 is a non-touchscreen, FIG. 6-3-3 is a schematic diagram of performing a paintbrush function in a mode in which a touch pen is positioned by using an ultrasonic wave. The digital pen 501 may draw on the screen of the terminal 502 by using the receiver 5021. FIG. 6-3-4 is a schematic diagram of nib floating for performing a paintbrush function in a mode in which a touch pen is positioned by using an ultrasonic wave. Details are not described herein.

Operation S4. Switch to an optical pen mode.

In some feasible embodiments, when the user Xiaochen uses the digital pen 501 to draw on the screen, Xiaochen may feel tired after sitting in one posture for a long time. In this case, Xiaochen may put the nib of the digital pen 501 on a desktop 503, the digital pen 501 may switch to the optical pen mode, and the sitting posture may be changed. FIG. 6-4-1 is a schematic diagram of a sitting posture of a user 504 during switching from an active pen mode/a mode in which a touch pen is positioned by using an ultrasonic wave to an optical pen mode. In this embodiment of the present disclosure, the user 504 controls a paintbrush on the desktop 503 by using the paintbrush function of the digital pen 501 in the optical pen mode, to continue drawing. FIG. 6-4-2 is a schematic diagram of a paintbrush mode in an optical pen mode used by a user. Similarly, when the user 504 moves the nib of the digital pen 501 away from the desktop 503, if a distance between the nib and the desktop 503 does not exceed a preset range, the digital pen 501 can still control the cursor on the screen, but may leave no trace. FIG. 6-4-3 is a schematic diagram of nib floating in a paintbrush mode in an optical pen mode used by a user 504. It should be noted that, to achieve optimal drawing experience, when the user 504 uses the paintbrush function of the digital pen 501 in the optical pen mode, a displacement ratio of a trace of the digital pen 501 to a mouse trace is 1:1.

Operation S5. Switch to the mouse function in the optical pen mode.

FIG. 6-5-1 is a schematic diagram of closing a drawing application by a user in an optical pen mode. In this embodiment of the present disclosure, after the drawing ends, the user may switch the digital pen 501 to the mouse function in the optical pen mode, to store the drawing and close the drawing software. FIG. 6-5-2 is a schematic diagram of performing a mouse function by a digital pen 501 in an optical pen mode. It should be noted that, after the drawing application is closed, a ratio of a displacement of the nib of the digital pen 501 to a displacement of the cursor on the screen may not be 1:1, but may be 1:n, where n may be any positive number, for example, 0.5, 1, 2, 3, or 4. This is not limited herein.

6. Another Embodiment of a Terminal 502

In some feasible embodiments, the terminal 502 may alternatively be an all-in-one machine/a desktop computer, a tablet computer, a mobile phone, or the like. This is not limited herein.

Figures 1, 2, 3, 4, 5, 6, 7:
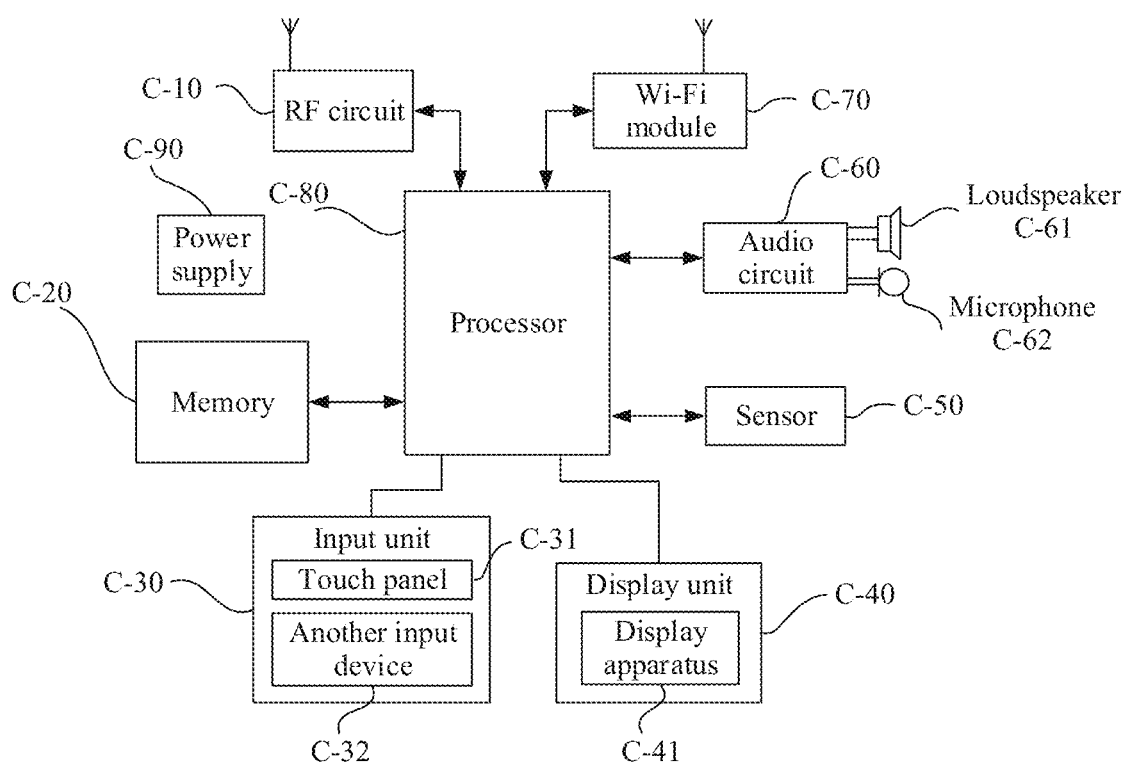

When the terminal 502 is the all-in-one machine/desktop computer, FIG. 7-1 is a schematic diagram of performing a mouse function on a non-touchscreen all-in-one machine/desktop computer by a digital pen 501 in an optical pen mode. When a user goes out with the digital pen 501, and needs to demonstrate the digital pen 501 of the user for another friend, or uses another computer to work, the user may control a mouse cursor on the all-in-one machine/desktop computer by using the digital pen 501. In this case, if the digital pen 501 detects an optical signal, the digital pen 501 enters an optical pen mode.

FIG. 7-2 is a schematic diagram of performing a paintbrush function on a non-touchscreen all-in-one machine/desktop computer by a digital pen 501 in an optical pen mode. The user may open a drawing application on the computer, and perform switching by using a button, using a gesture, or receiving an instruction, so that the digital pen 501 enters the paintbrush function, and the user draws or writes on the application by using the digital pen 501.

In some cases, if a drawing capability cannot be well presented on a desktop 503, drawing needs to be performed on a screen. FIG. 7-3 is a schematic diagram of performing a paintbrush function on a non-touchscreen all-in-one machine/desktop computer by a digital pen 501 in a mode in which a touch pen is positioned by using an ultrasonic wave. The user may implement a drawing function on a screen of a non-touchscreen terminal 502 by using the digital pen 501 and a receiver 5021.

When leaving the drawing application, the digital pen 501 may enter a mouse function. FIG. 7-4 is a schematic diagram of performing a mouse function on a non-touchscreen all-in-one machine/desktop computer by a digital pen 501 in a mode in which a touch pen is positioned by using an ultrasonic wave.

Similarly, when the user goes out, on a vehicle, it is relatively convenient to carry a tablet computer, and the digital pen 501 may be used on the tablet computer. FIG. 7-5 is a schematic diagram of performing a mouse function on a touchscreen tablet computer by a digital pen 501 in an optical pen mode. The digital pen 501 may control a cursor on the touchscreen tablet computer. It should be noted that the tablet computer has a cursor function. If the user wants to draw a picture, the user may open a drawing application for drawing. FIG. 7-6 is a schematic diagram of performing a paintbrush function on a touchscreen tablet computer by a digital pen 501 in an optical pen mode.

When the user arrives at home by using a vehicle, if the user wants to continue to use the tablet computer, the user may draw on the tablet computer, and may use the digital pen 501 on a desktop 503 to enter the optical pen mode, so as to perform a paintbrush function. FIG. 7-7 is a schematic diagram of performing a paintbrush function on a touchscreen tablet computer by a digital pen 501 in an optical pen mode. It should be noted that, when the paintbrush function is performed, a ratio of a motion displacement of the digital pen 501 to a displacement of a cursor on the tablet computer may be 1:1.

Figures 1, 2, 3, 4, 5, 6, 7, 8:
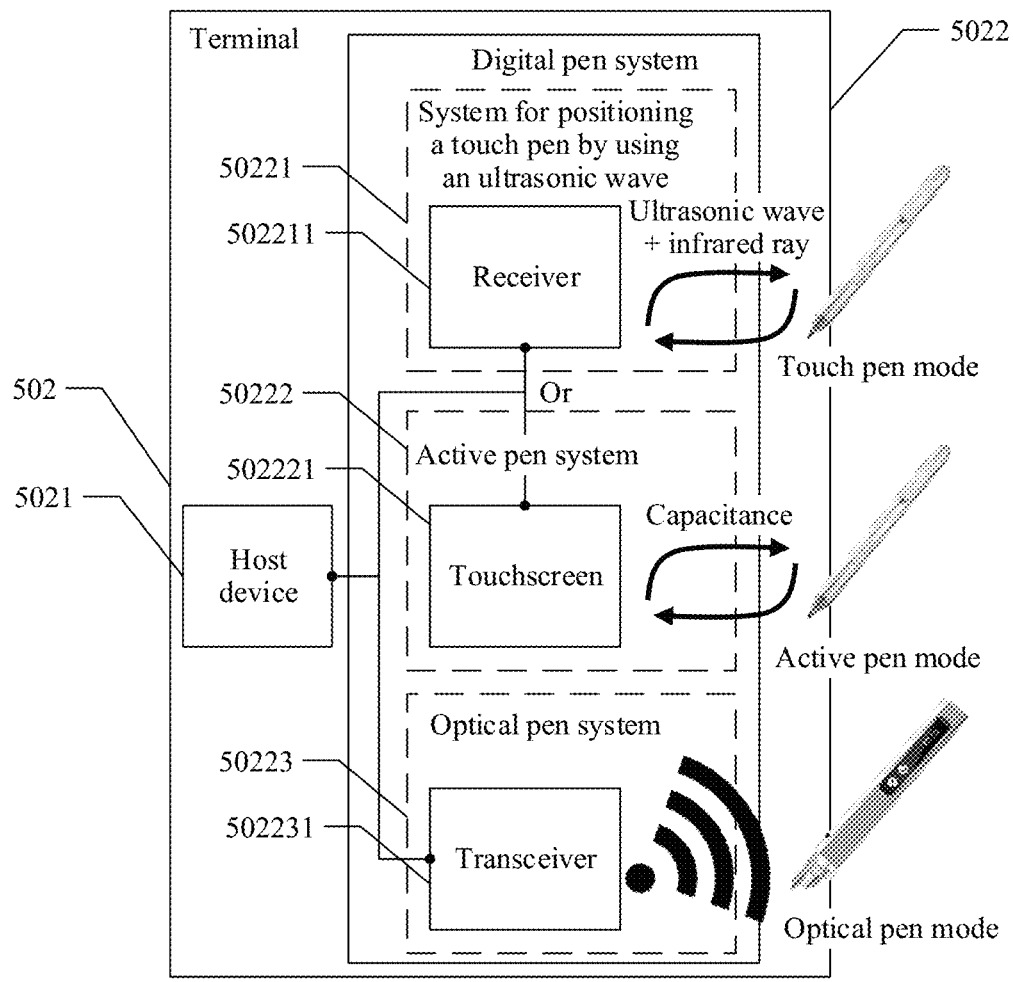
Figures 1, 2:
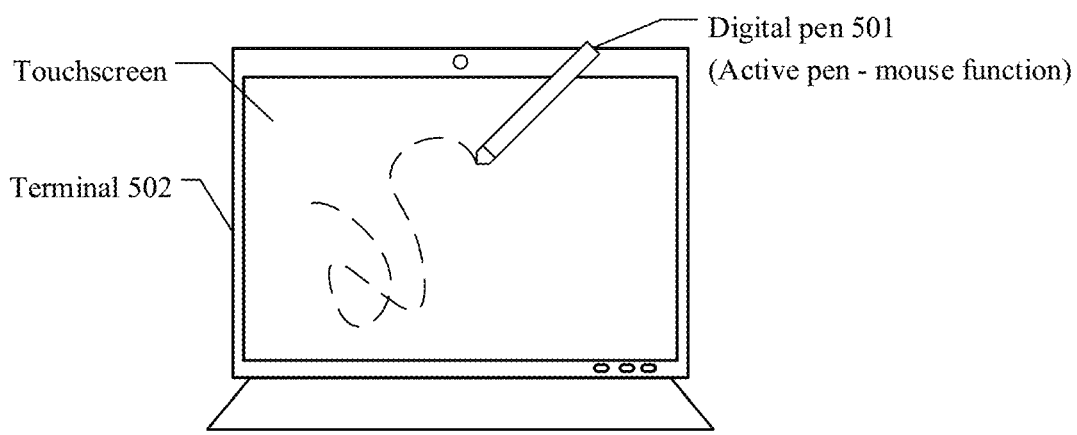
Figure 2:
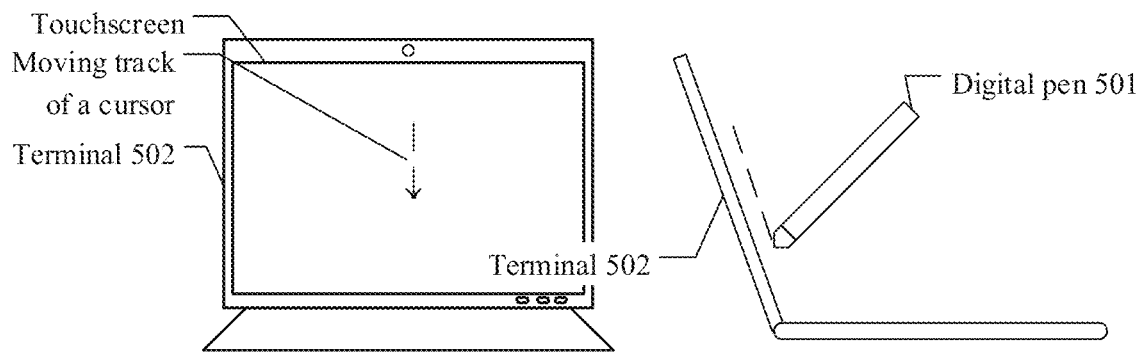
Figures 2, 3:
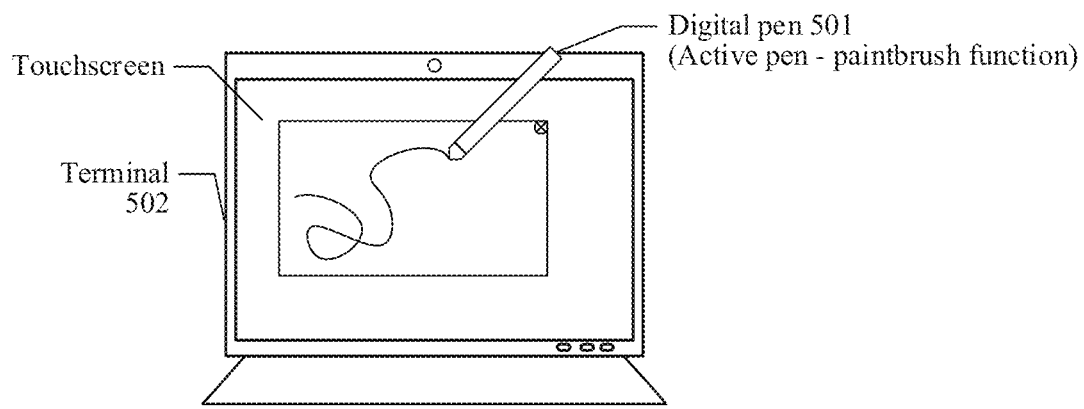
Figures 2, 3, 4:
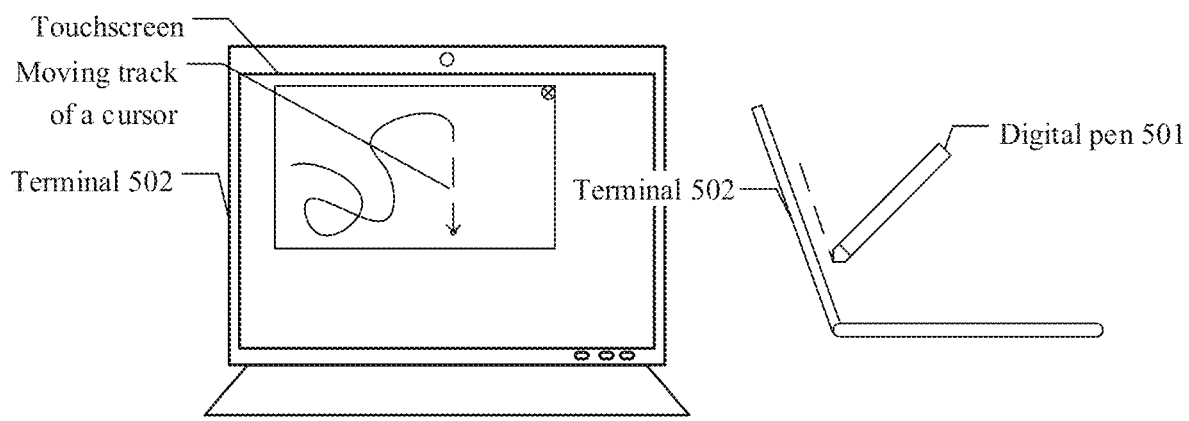
Figures 1, 3:
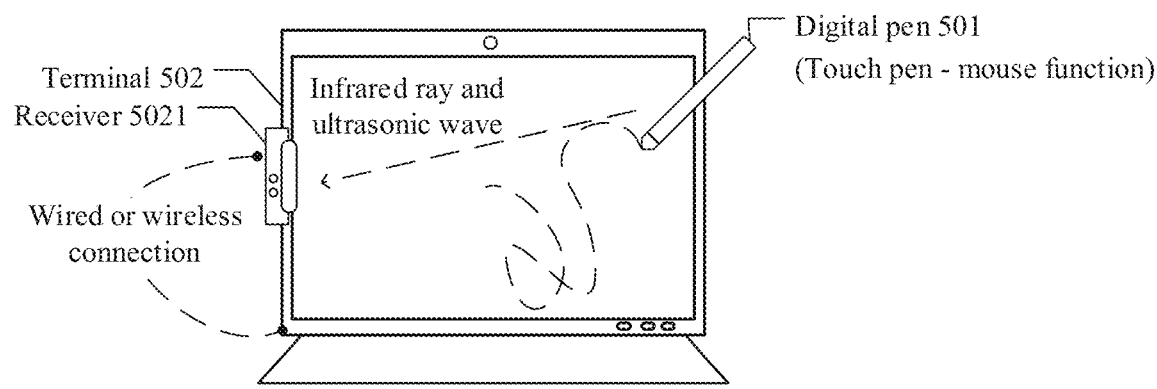
Figures 2, 3:
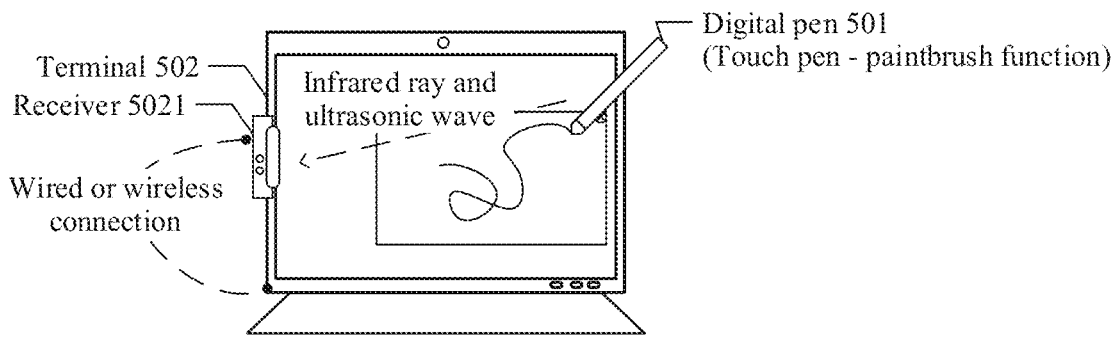
Figures 1, 4:
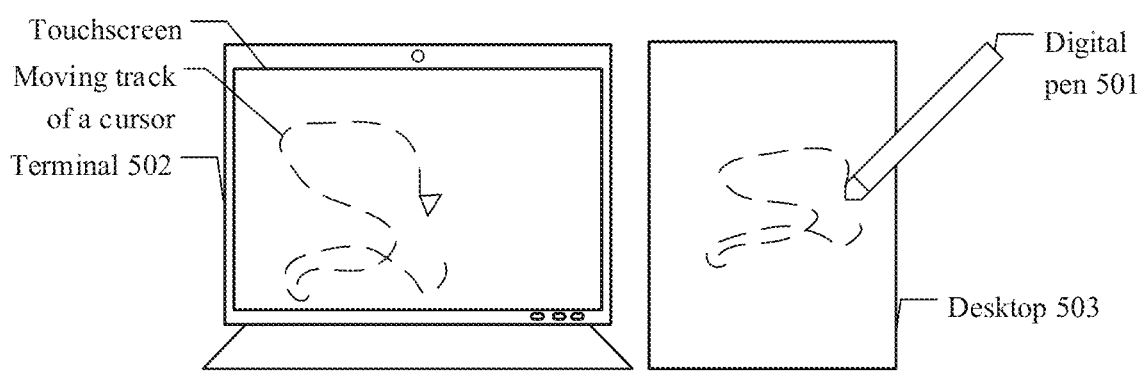
Figures 2, 4:
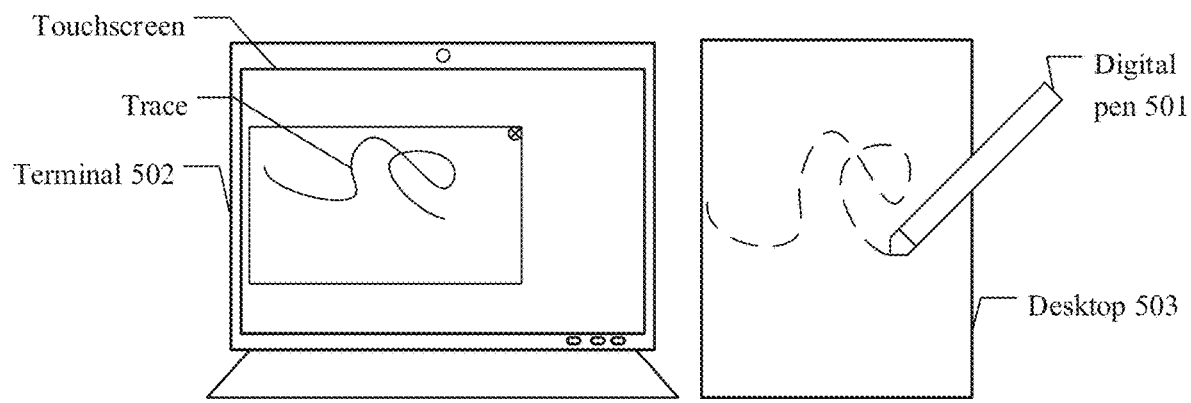
Figures 3, 4:
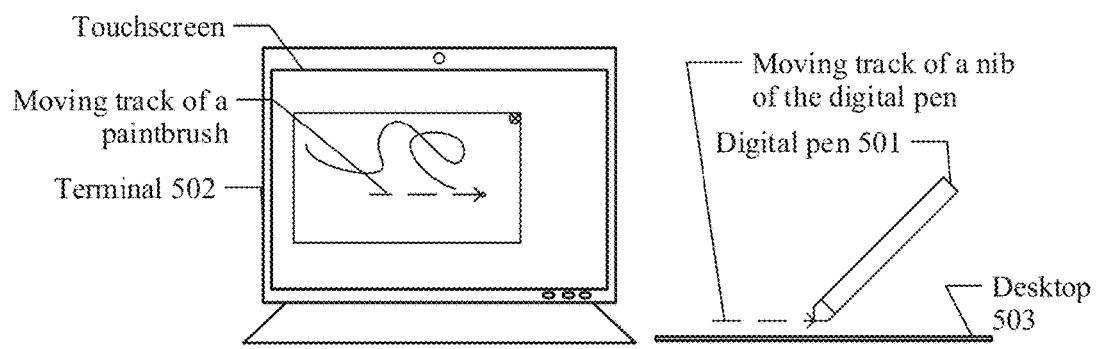
Figures 1, 5:
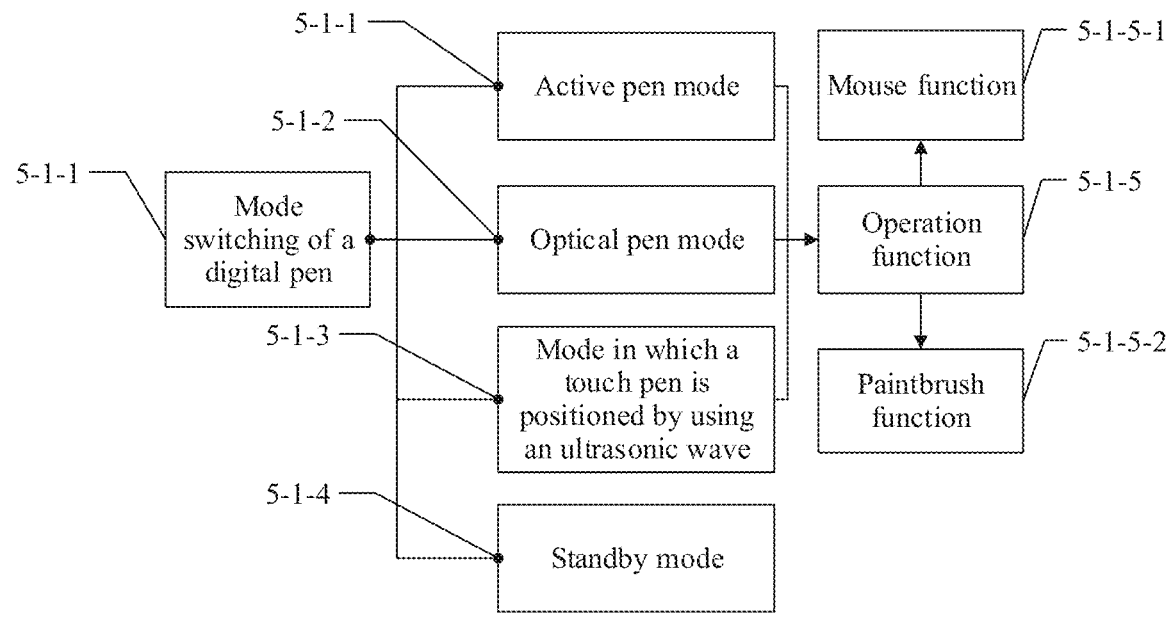
Figures 2, 5:
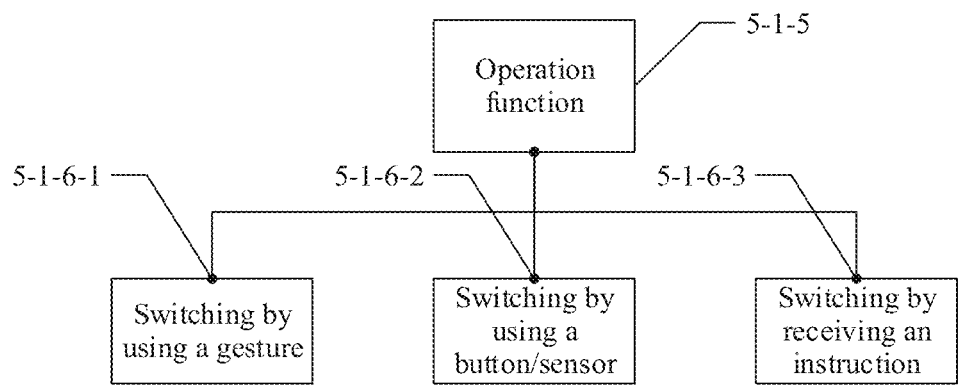
Figures 1, 6:
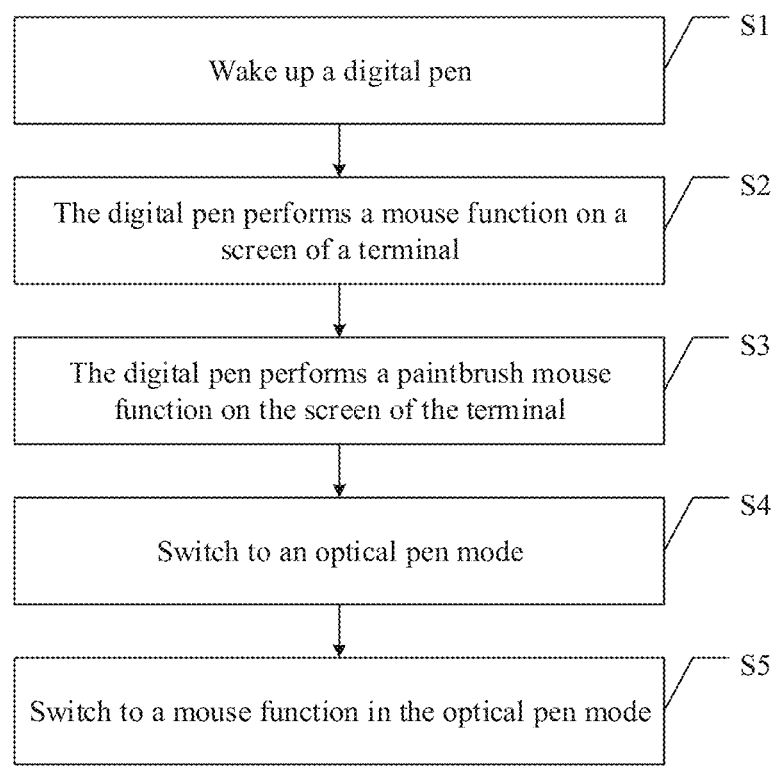
Figures 1, 2, 6:
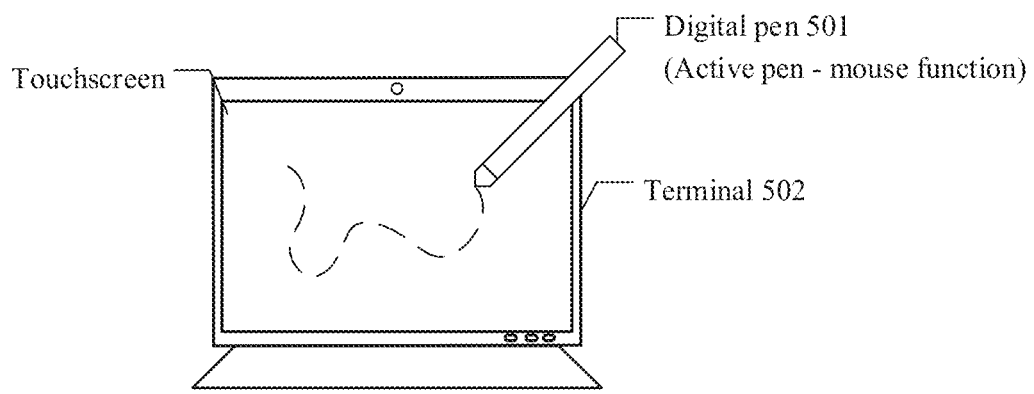
Figures 2, 6:
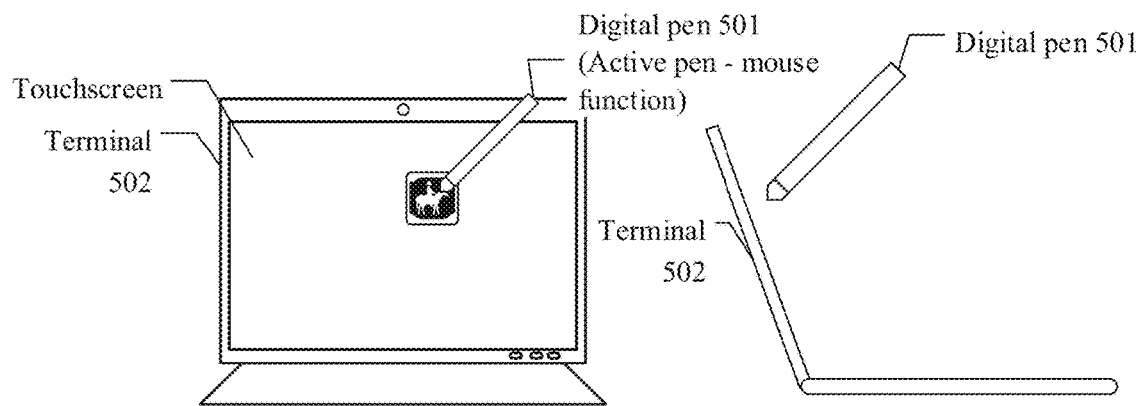
Figures 2, 3, 6:
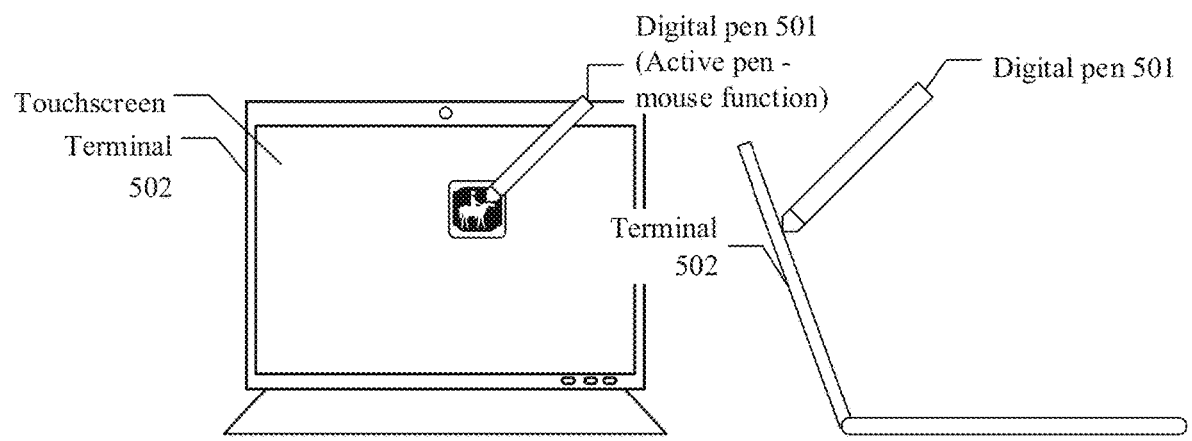
Figures 2, 4, 6:
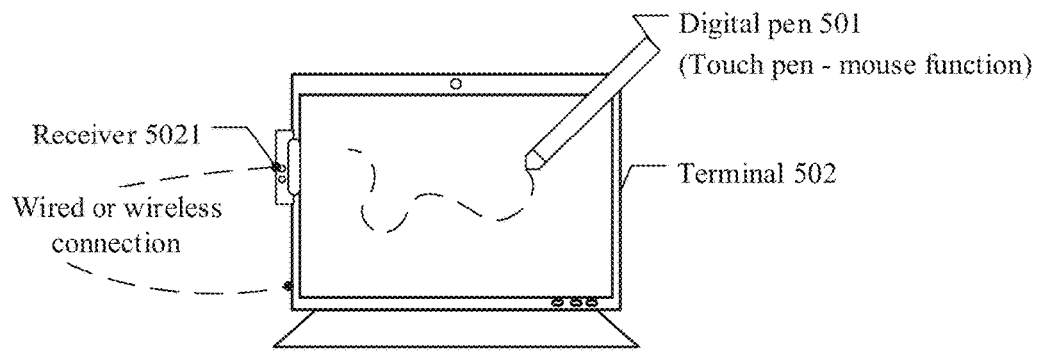
Figures 2, 5, 6:
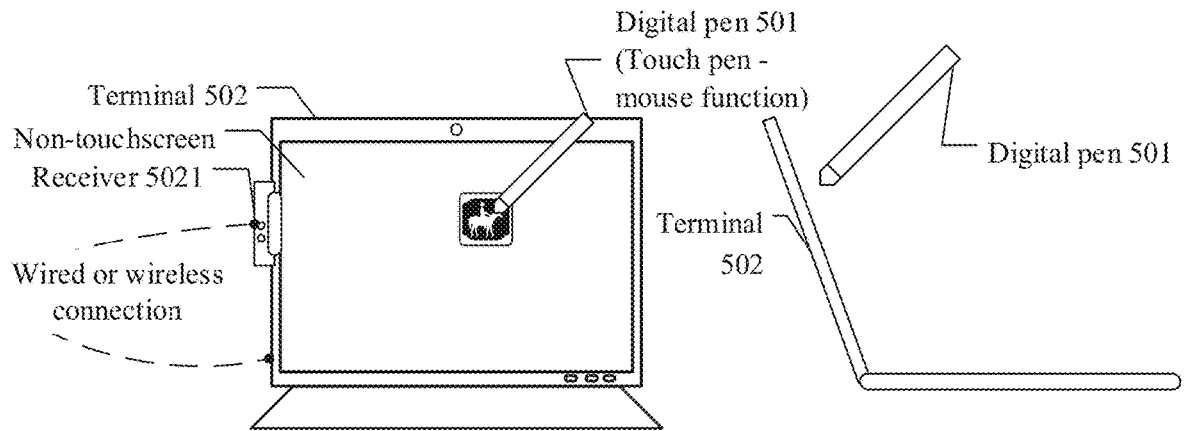
Figures 2, 6:
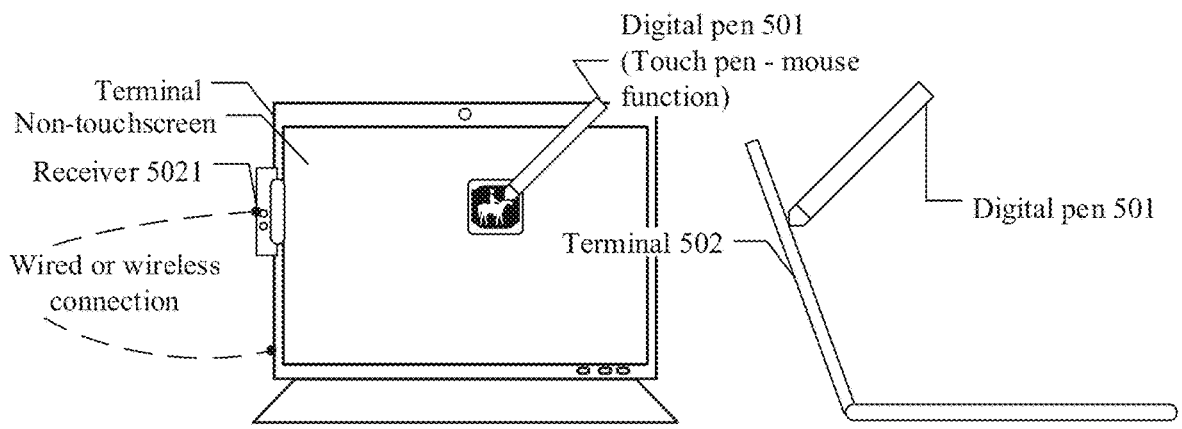
Figures 1, 3, 6:
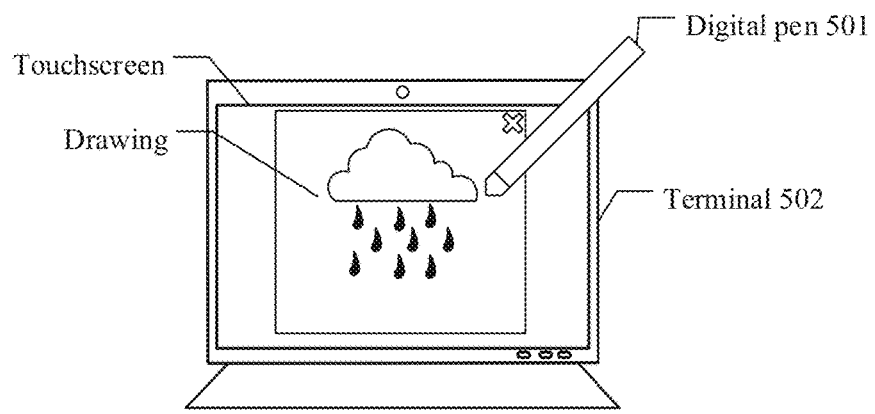
Figures 2, 3, 6:
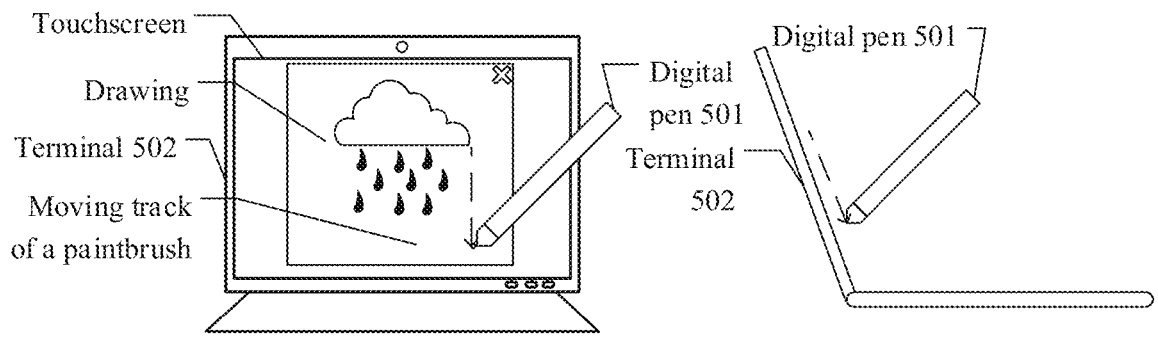
Figures 3, 6:
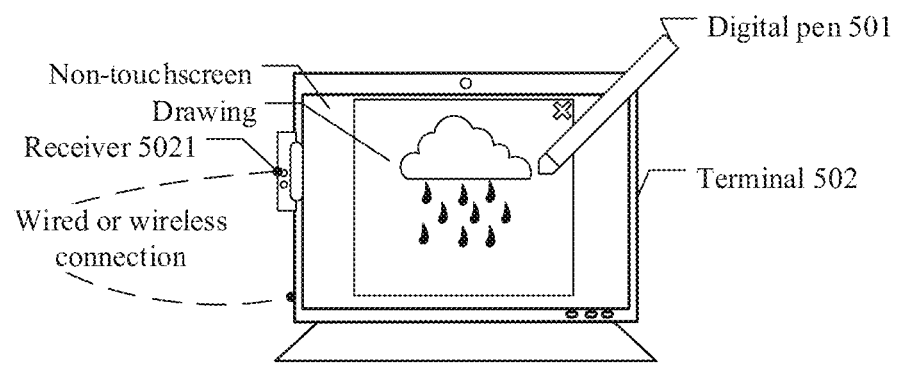
Figures 3, 4, 6:
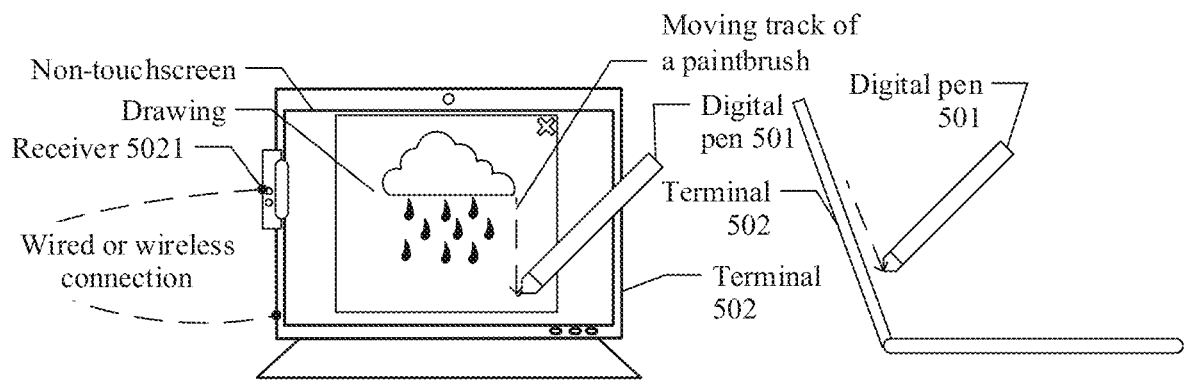
Figures 1, 4, 6:
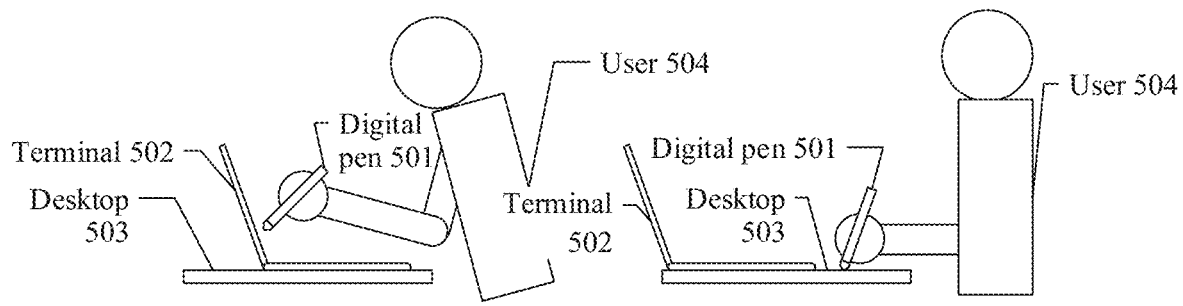
Figures 2, 4, 6:
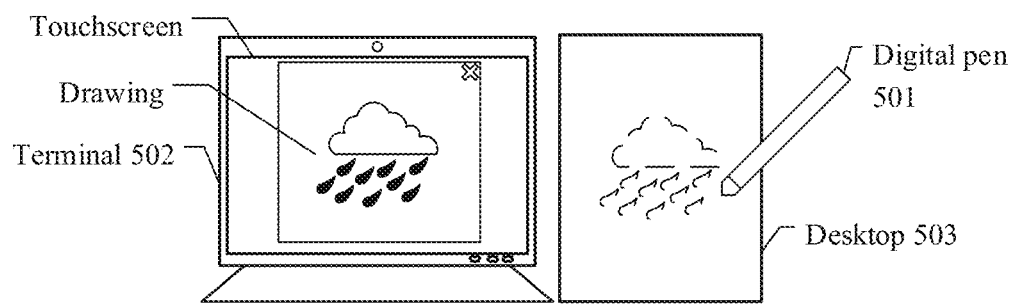
Figures 3, 4, 6:
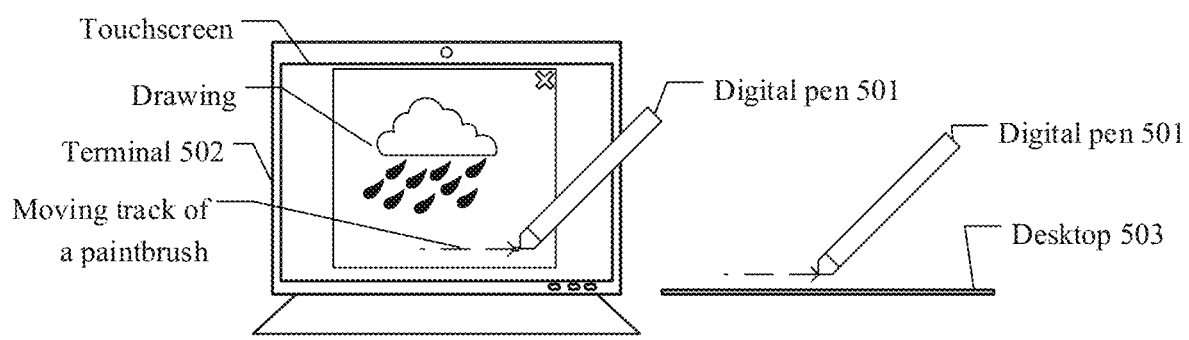
Figures 1, 5, 6:
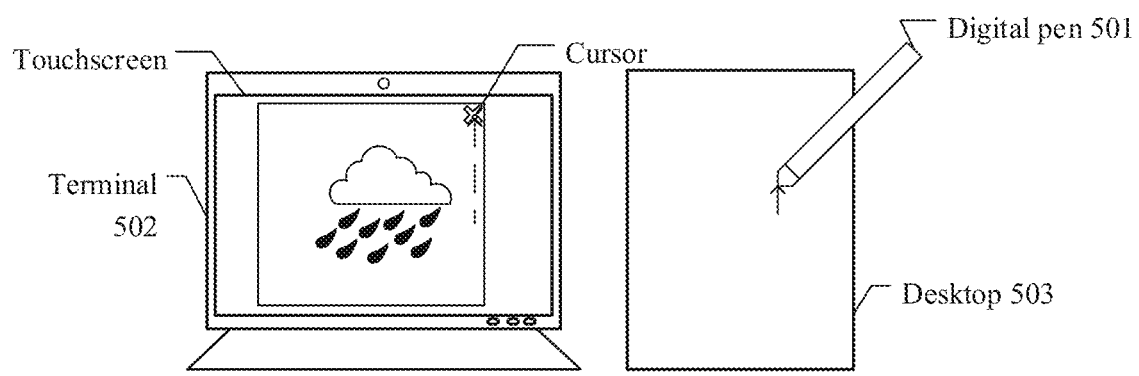
Figures 2, 5, 6:
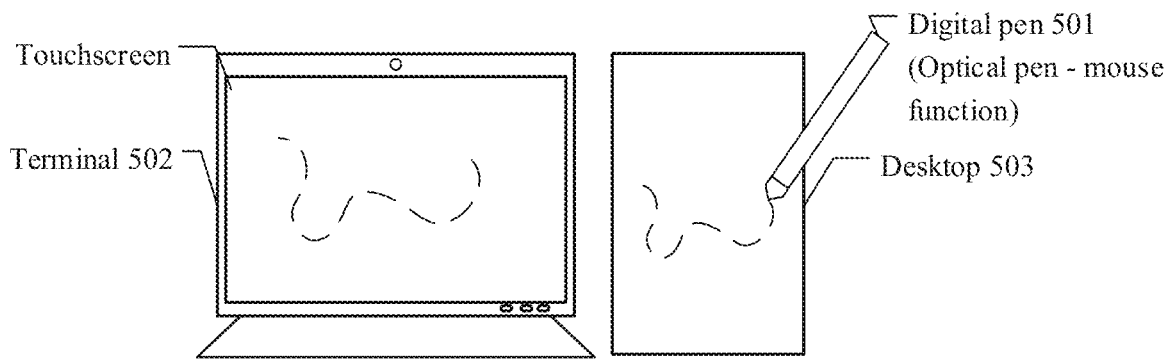

When the drawing ends, the user continues to use the computer, and performs a mouse function on the desktop 503 in the optical pen mode. When the paintbrush function is performed, a ratio of a motion displacement of the digital pen 501 to a displacement of a cursor on the tablet computer may be 1:n, where n is any positive number. FIG. 7-8 is a schematic diagram of performing a mouse function on a touchscreen tablet computer by a digital pen 501 in an optical pen mode.

Figures 1, 7:
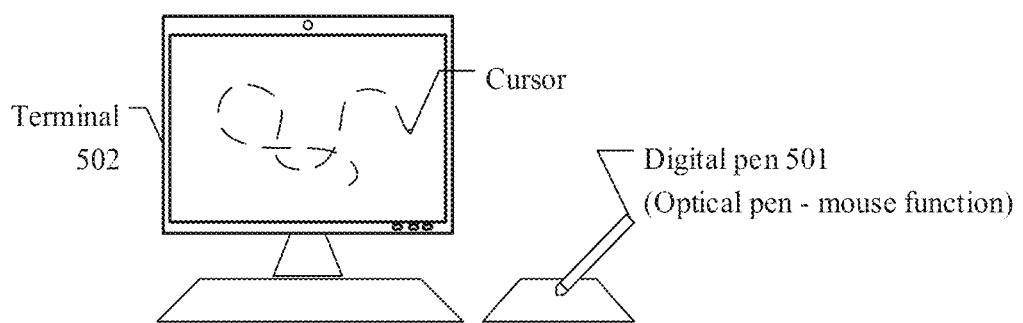
Figures 2, 7:
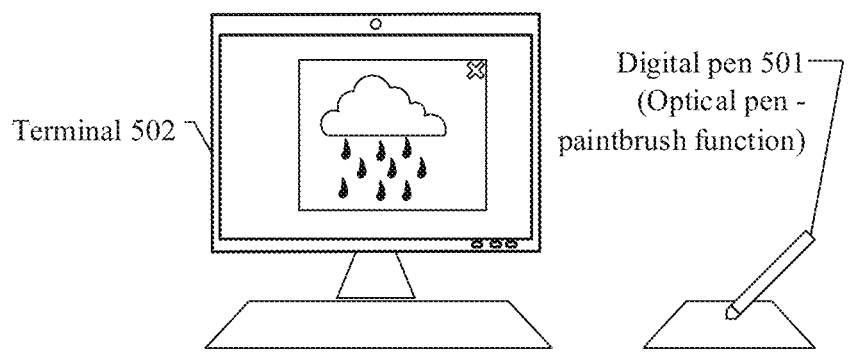
Figures 3, 7:
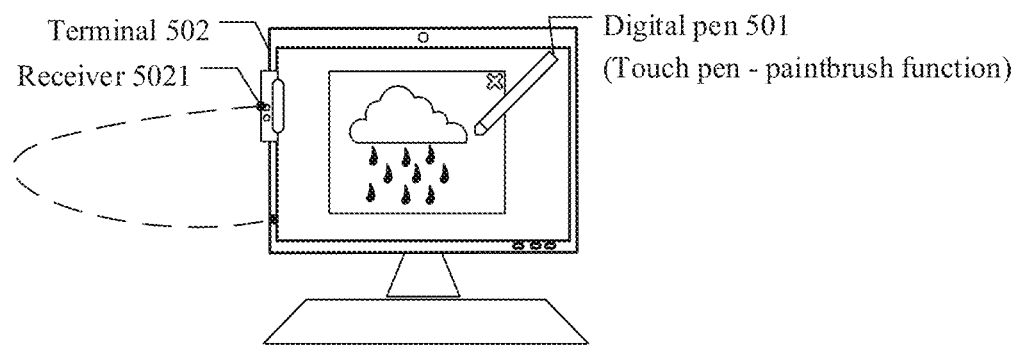
Figures 4, 7:
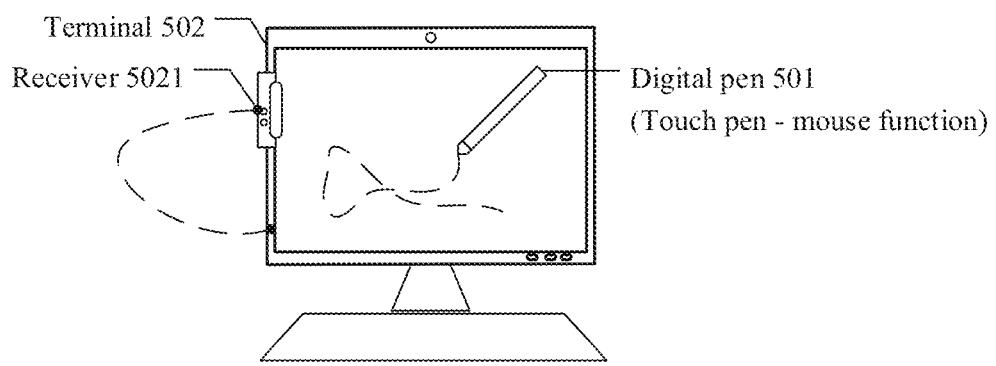
Figures 5, 7:
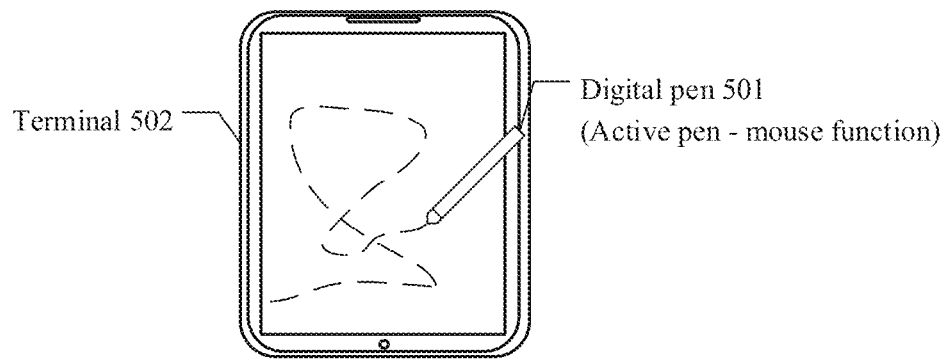
Figures 6, 7:
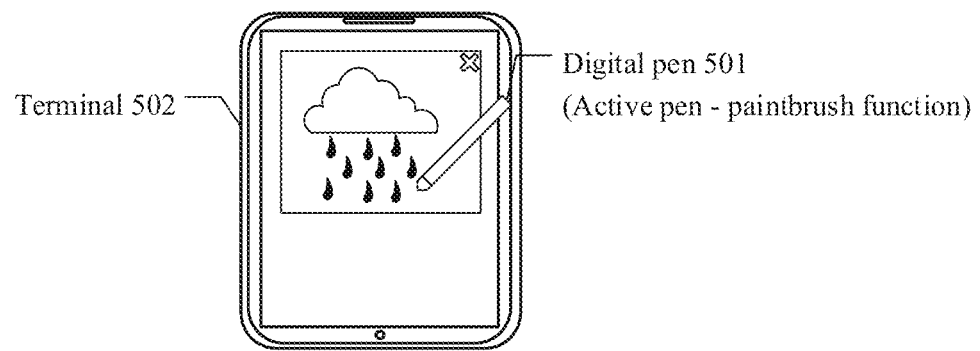
Figure 7:
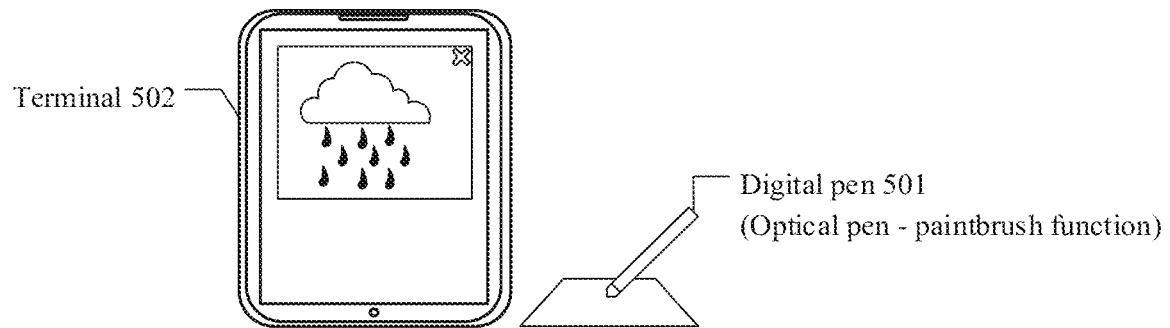
Figures 7, 8:
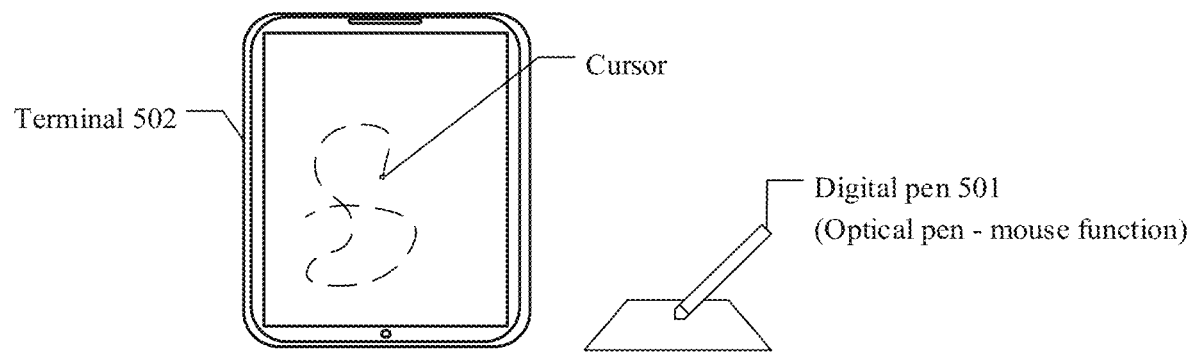
Figures 7, 8, 9:
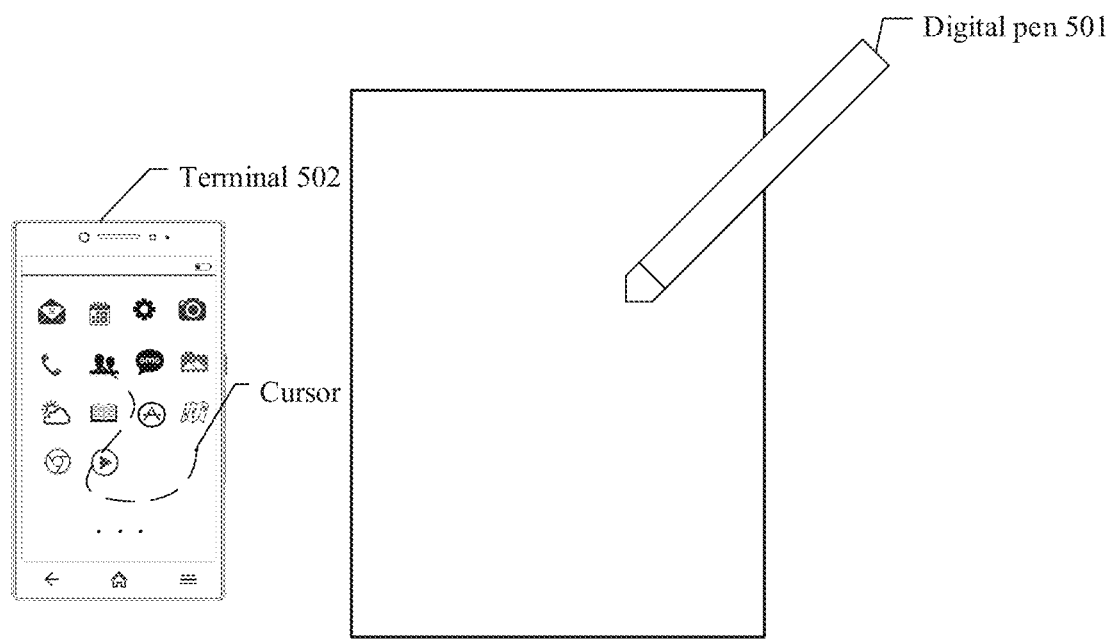
Figures 7, 8, 9, 10:
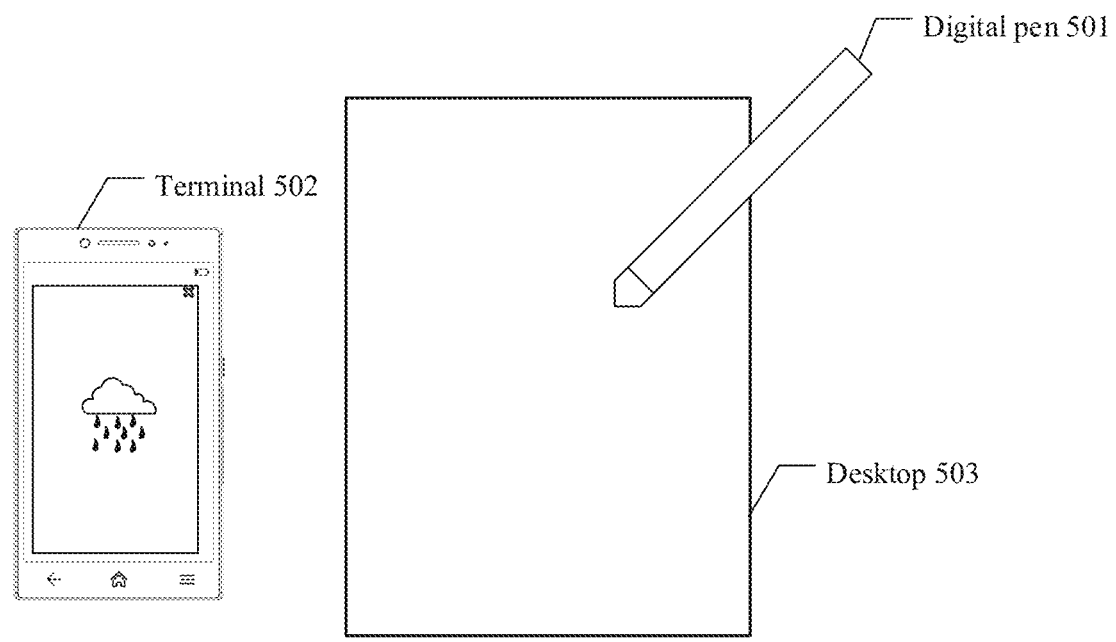
Figures 7, 8, 9, 10, 11:
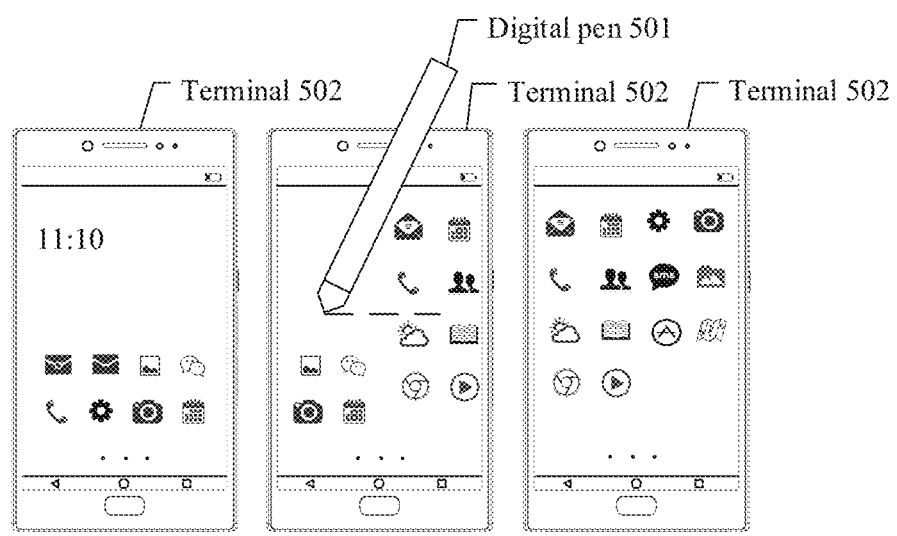
Figures 7, 8, 9, 10, 11, 12:
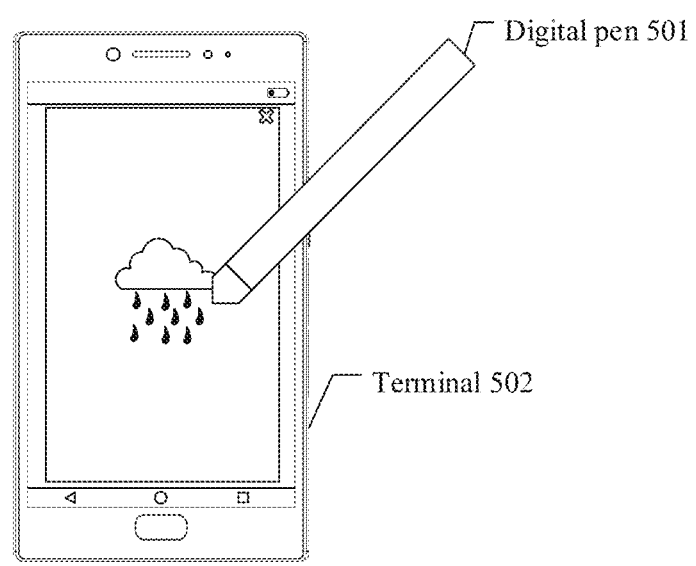

In some feasible embodiments, the digital pen 501 may further perform the mouse function or the paintbrush function on a mobile phone having a cursor function. FIG. 7-9 is a schematic diagram of performing a mouse function on a mobile phone having a mouse function, by a digital pen 501 in an optical pen mode. The user may control the mobile phone by using the mouse function in the optical pen mode. FIG. 7-10 is a schematic diagram of performing a paintbrush function on a mobile phone having a mouse function, by a digital pen 501 in an optical pen mode. The user may control the mobile phone by using the paintbrush function in the optical pen mode.

In some feasible embodiments, the digital pen 501 may further perform the mouse function or the paintbrush function on a mobile phone having no cursor function. FIG. 7-11 is a schematic diagram of performing a mouse function on a touchscreen mobile phone having no mouse function, by a digital pen 501 in an active pen mode. The user may control the mobile phone by using the mouse function in the optical pen mode. FIG. 7-12 is a schematic diagram of performing a paintbrush function on a touchscreen mobile phone having no mouse function, by a digital pen 501 in an active pen mode. The user may control the mobile phone by using a drawing function in the active pen mode.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium, for example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An electronic device control method implemented on an input device, wherein the method comprises:
    controlling, by the input device, an electronic device through a touch apparatus of the electronic device when the input device detects that the input device is in contact with the touch apparatus of the electronic device; and
    when the input device detects that the input device is in contact with an object surface beyond the touch apparatus of the electronic device,
    determining, by the input device, an operation function based on an operation action performed by a user on the input device;
    detecting, by the input device, a motion of the input device on the object surface; and
    sending information about the motion of the input device and the operation function to the electronic device, to control the electronic device and cause the electronic device to:
    determine a displacement ratio based on the operation function, and determine, based on the information about the motion and the displacement ratio, a displacement identified on the electronic device.

2. The method according to claim 1, wherein that the input device detects that the input device is in contact with the touch apparatus of the electronic device comprises:
    detecting, by the input device, a touch signal of the touch apparatus, wherein signal strength of the touch signal is greater than a preset strength value.

3. The method according to claim 2, wherein the touch signal is a capacitive touch signal, an electromagnetic touch signal, or an optical touch signal.

4. The method according to claim 1, wherein the controlling, by the input device, an electronic device by using a touch apparatus of the electronic device comprises:
    sending, by the input device, a first signal to the electronic device, so that the electronic device determines a position of the input device on the touch apparatus by using the first signal.

5. The method according to claim 1, wherein the controlling, by the input device, an electronic device by using a touch apparatus further comprises:
    obtaining, by the input device, pressure information of the contact with the touch apparatus by using a pressure sensor; and
    sending, by the input device, the pressure information to the electronic device, to control the electronic device.

6. The method according to claim 1, wherein the touch apparatus comprises a touchpad or a touchscreen.

7. The method according to claim 1, wherein that the input device detects that the input device is in contact with an object surface beyond the touch apparatus of the electronic device comprises:
    detecting, by the input device, no touch signal of the touch apparatus, or detecting that the signal strength of the touch signal does not meet a preset condition; and transmitting, by the input device, a first optical detection signal, and detecting that reflection strength of a reflected signal that is of the first optical detection signal and that is on the object surface meets the preset condition.

8. The method according to claim 7, wherein the detecting, by the input device, a motion of the input device on the object surface comprises:
transmitting, by the input device, a second optical detection signal, and determining the motion of the input device on the object surface by using a reflected signal that is of the second optical detection signal and that is on the object surface.

9. The method according to claim 8, wherein the first optical detection signal and the second optical detection signal are infrared signals or Blu-ray signals.

10. The method according to claim 7, wherein the sending, by the input device, information about the motion to the electronic device comprises:
sending, by the input device, the information about the motion to the electronic device by using a wired signal, a Bluetooth signal, or a Wi-Fi signal.

11. The method according to claim 7, wherein
the displacement ratio is 1:n when the input device performs a mouse function, wherein n is any positive number; or
the displacement ratio is 1:1 when the input device performs a paintbrush function.

12. The method according to claim 7, wherein the determining, by the input device, the operation function based on an operation action performed by the user on the input device comprises:
detecting, by the input device, a movement performed by the user on the input device based on a preset action, to determine the operation action; or
receiving, by at least one button of the input device, tapping performed by the user in preset order, to determine the operation action; or
receiving, by the input device, a function switching signal sent by the user by using the electronic device, to determine the operation action.

13. The method according to claim 1, wherein the method further comprises:
controlling, by the input device, the electronic device by using a positioning apparatus when the input device detects the positioning apparatus of the electronic device.

14. An input device, comprising a processor, a memory, and one or more application programs, wherein
the one or more application programs are stored in the memory, the one or more application programs comprise an instruction, and when the instruction is executed by the input device, the input device is enabled to perform the following operations:
controlling an electronic device by using a touch apparatus of the electronic device when detecting that the input device is in contact with the touch apparatus of the electronic device; and
when detecting that the input device is in contact with an object surface beyond the touch apparatus of the electronic device,
determining an operation function based on an operation action performed by a user on the input device;
detecting a motion of the input device on the object surface, and sending information about the motion of the input device and the operation function to the electronic device, to control the electronic device and cause the electronic device to:
determine a displacement ratio based on the operation function, and determine, based on the information about the motion and the displacement ratio, a displacement identified on the electronic device.

15. The input device according to claim 14, wherein in the operation in which the input device detects that the input device is in contact with the touch apparatus of the electronic device, the at least one processor executes the several instructions to enable the input device to perform at least the following operation:
detecting a touch signal of the touch apparatus, wherein signal strength of the touch signal is greater than a preset strength value.

16. The input device according to claim 14, wherein in the operation in which the input device controls the electronic device by using the touch apparatus, the at least one processor executes the several instructions to enable the input device to perform at least the following operation:
sending a first signal to the electronic device, so that the electronic device determines a position of the input device on the touch apparatus by using the first signal.

17. The input device according to claim 14, wherein in the operation in which the input device controls the electronic device by using the touch apparatus, the at least one processor executes the several instructions to enable the input device to perform at least the following operations:
obtaining pressure information of the contact with the touch apparatus by using a pressure sensor; and
sending the pressure information to the electronic device, to control the electronic device.

18. The input device according to claim 14, wherein in the operation in which the input device detects that the input device is in contact with the object surface beyond the touch apparatus of the electronic device, the at least one processor executes the several instructions to enable the input device to perform at least the following operations:
detecting no touch signal of the touch apparatus, or detecting that the signal strength of the touch signal does not meet a preset condition; and
transmitting a first optical detection signal, and detecting that reflection strength of a reflected signal that is of the first optical detection signal and that is on the object surface meets the preset condition.

19. A non-transitory computer-readable storage medium, comprising an instruction stored therein, which when executed by a processor of an input device, cause the input device to perform operations, the operations comprising:
controlling an electronic device through a touch apparatus of the electronic device when the input device detects that the input device is in contact with the touch apparatus of the electronic device; and
when the input device detects that the input device is in contact with an object surface beyond the touch apparatus of the electronic device,
determining, by the input device, an operation function based on an operation action performed by a user on the input device; and
detecting, by the input device, a motion of the input device on the object surface, and sending information about the motion to the electronic device, to control the electronic device and cause the electronic device to:
determine a displacement ratio based on the operation function, and determine, based on the information about the motion and the displacement ratio, a displacement identified on the electronic device.

\* \* \* \* \*